「US009672343B2」

United States Patent
Matsushima

(10) Patent No.: US 9,672,343 B2
(45) Date of Patent: Jun. 6, 2017

(54) INFORMATION PROCESSING APPARATUS, METHOD FOR CONTROLLING INFORMATION PROCESSING APPARATUS, AND STORAGE MEDIUM

(71) Applicant: CANON KABUSHIKI KAISHA, Tokyo (JP)

(72) Inventor: Hiroki Matsushima, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/724,034

(22) Filed: May 28, 2015

(65) Prior Publication Data

US 2015/0347739 A1  Dec. 3, 2015

(30) Foreign Application Priority Data

May 30, 2014 (JP) .................................. 2014-112810
Jun. 3, 2014 (JP) .................................. 2014-114671

(51) Int. Cl.
*G06F 21/00* (2013.01)
*G06F 21/34* (2013.01)
*G06F 21/32* (2013.01)

(52) U.S. Cl.
CPC .............. *G06F 21/34* (2013.01); *G06F 21/32* (2013.01); *G06F 2221/2139* (2013.01)

(58) Field of Classification Search
CPC ..................................................... G06F 21/34
USPC ......................................................... 726/20
See application file for complete search history.

(56) References Cited

U.S. PATENT DOCUMENTS 7,420,546 B2 * 9/2008 Abdallah ................ G06F 21/32
345/156

FOREIGN PATENT DOCUMENTS

| JP | 2003-178034 A | 6/2003 |
|---|---|---|
| JP | 2005-27095 A | 1/2005 |
| JP | 2006-268614 A | 10/2006 |
| JP | 2010-262-454 A | * 11/2010 |
| JP | 2010-262454 A | 11/2010 |

* cited by examiner

*Primary Examiner* — Longbit Chai
(74) *Attorney, Agent, or Firm* — Canon USA, Inc. IP Division

(57) ABSTRACT

A conventional information processing apparatus which allows simultaneous parallel use by a plurality of users includes a plurality of operation units to receive operations of the respective plurality of users, so that the information processing apparatus can be simultaneously used. Such a configuration is wasteful in terms of equipment, resources, and space. According to an exemplary embodiment of the present invention, an information processing apparatus which allows simultaneous parallel use by a plurality of users includes a single display unit configured to be able to input operation instructions to the information processing apparatus, and a control unit configured to perform display control to display an operation input screen corresponding to a first user and an operation input screen corresponding to a second user on the single display unit in a split display mode or in an alternate display mode.

14 Claims, 21 Drawing Sheets

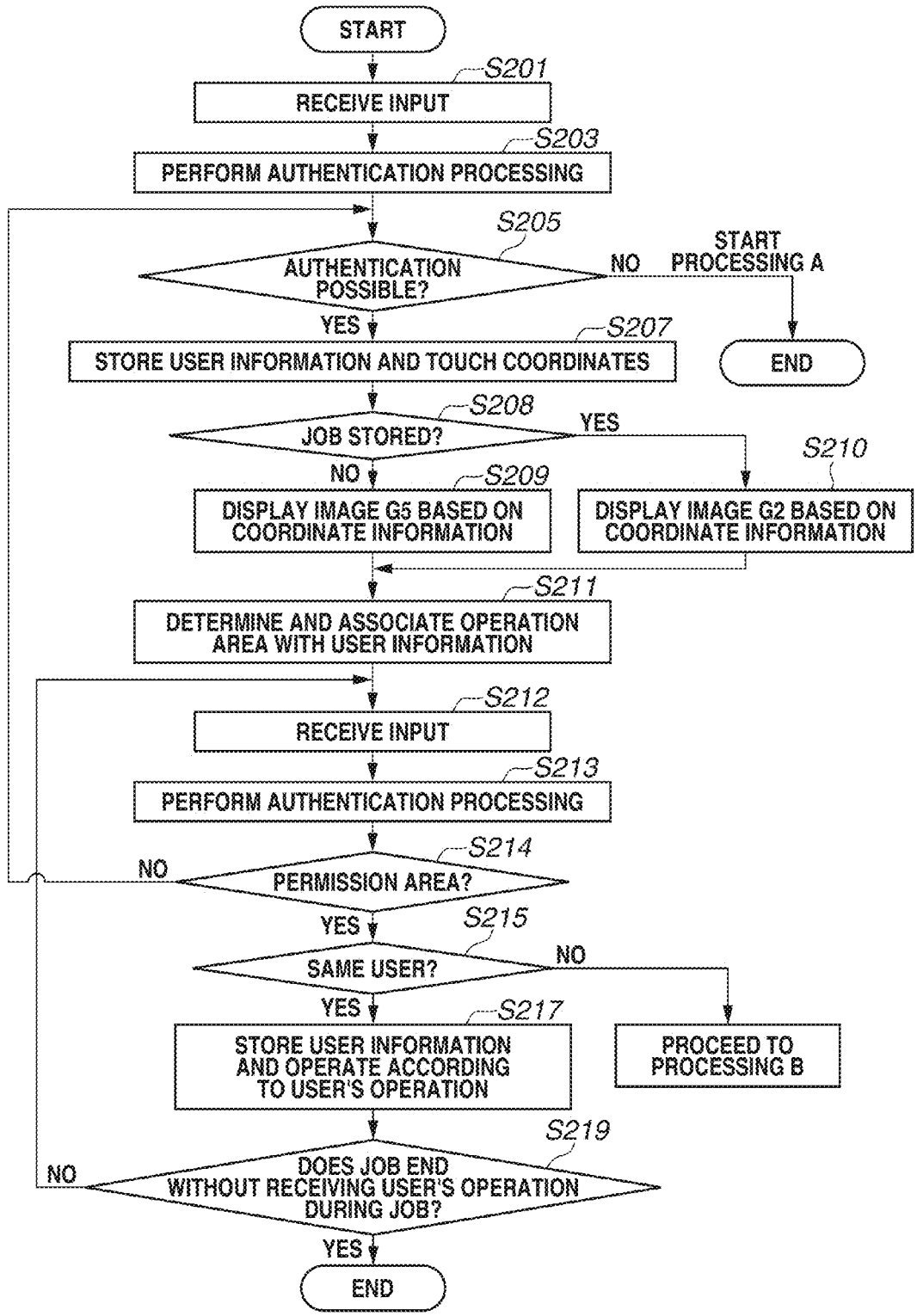

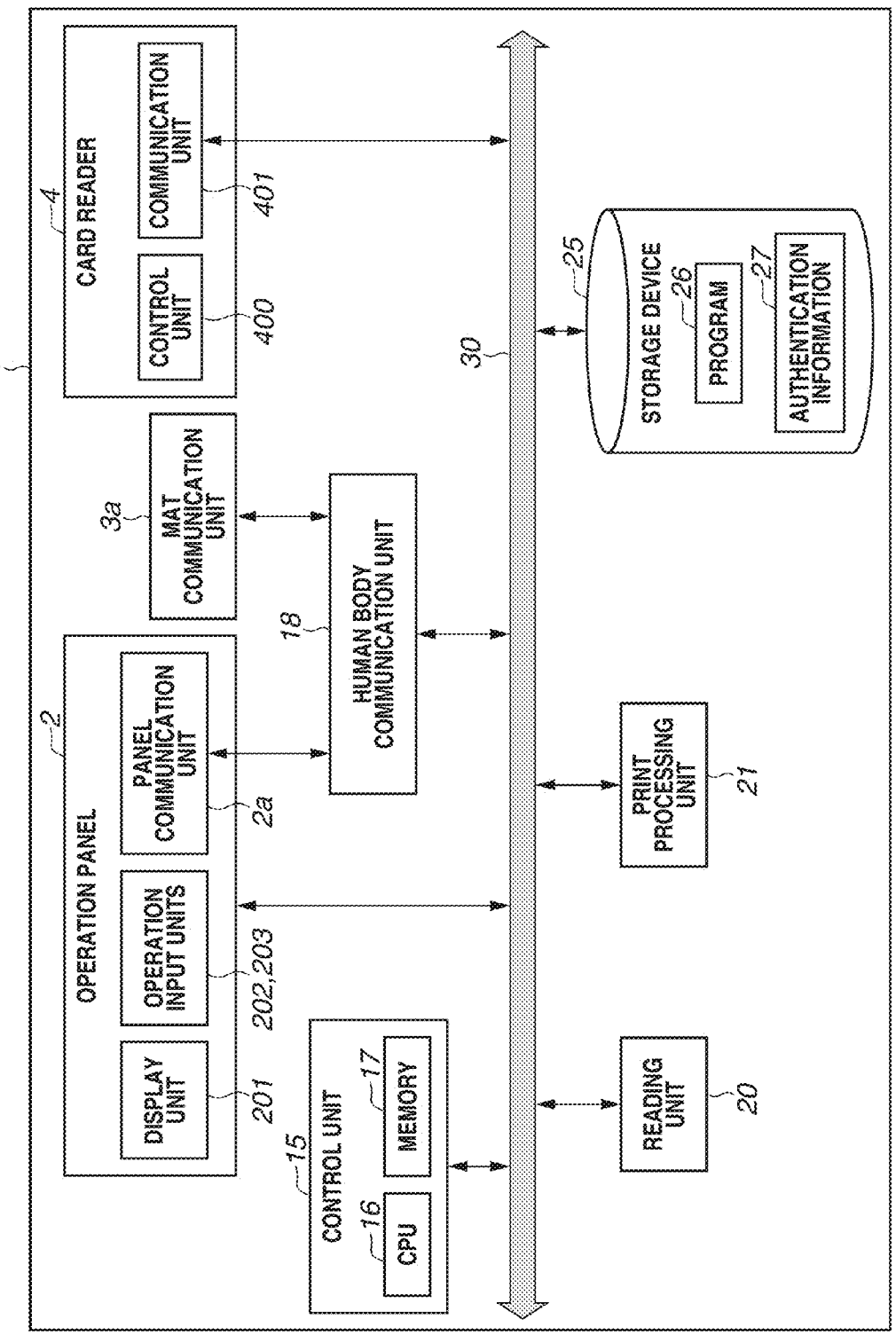

INFORMATION PROCESSING APPARATUS, METHOD FOR CONTROLLING INFORMATION PROCESSING APPARATUS, AND STORAGE MEDIUM

BACKGROUND OF THE INVENTION

Field of the Invention

The present invention relates to an information processing apparatus that can perform processing of a plurality of users in parallel, and a method for controlling the information processing apparatus. In particular, the present invention relates to an information processing apparatus that includes a personal authentication device using human body communication and can perform various types of processing in parallel, including personal authentication of a plurality of users.

Description of the Related Art

When a user uses an information processing apparatus such as a printer and a multifunctional peripheral (MFP) having various functions such as a copy function, a scanner function, a facsimile (FAX) function, and a print function, personal authentication is usually performed first and then an operation is permitted.

There are various methods for personal authentication, including a method in which a user inputs a password and a method that uses biometric information as authentication information. Examples of the biometric information include a person's fingerprints and vein pattern.

A user may own an integrated circuit (IC) card in which the user's identifier (ID) and password are stored. An authentication system may read the ID and password to perform authentication (for example, see Japanese Patent Application Laid-Open No. 2003-178034).

In any of such authentication methods, the number of users to be authenticated at a time is limited to one. A single operation input unit provided on the main body of the information processing apparatus operates by accepting only the operation of the one authenticated user.

An authentication technique using human body communication has been recently put to practical use (for example, see Japanese Patent Application Laid-Open No. 2006-268614 and Japanese Patent Application Laid-Open No. 2005-27095). According to the authentication technique, if a user who carries a mobile terminal containing authentication information touches a reception unit of an authentication device with a hand or foot, the mobile terminal and the authentication device can perform transmission and reception with each other by using the user's human body as a communication path. The authentication information in the mobile terminal can thus be transmitted to the authentication device for user identification and authentication.

To perform personal authentication using human body communication, the user carrying the mobile terminal has only to touch a specific area of the authentication device. The user's operation is thus extremely simple. The authentication information, which is confidential information, is directly transmitted to the authentication device via the human body only at the time of contact. This makes information leakage less likely to occur and ensures high security. Such an authentication method is expected to become prevalent in the future.

The authentication processing for personal authentication using human body communication is performed simultaneously with the user's simple single-touch operation. This allows authentication processing and login of a plurality of users to be quickly performed in succession. Thereby, this authentication method is expected to be applied to simultaneous parallel use of a single information processing apparatus by a plurality of users (see Japanese Patent Application Laid-Open No. 2010-262454).

SUMMARY OF THE INVENTION

The present invention is directed to a technique for performing personal authentication using human body communication simultaneously with a touch operation by a user and for displaying an operation input screen corresponding to the user.

According to an aspect of the present invention, an information processing apparatus which includes a display unit and to which a user can log in includes an authentication unit configured to perform human body communication with a mobile terminal carried by a user who logs in to perform authentication processing on the user who logs in, and a display control unit configured to display an operation input screen on the display unit, the operation input screen corresponding to a user authenticated by the authentication unit.

Further features of the present invention will become apparent from the following description of exemplary embodiments with reference to the attached drawings.

BRIEF DESCRIPTION OF THE DRAWINGS

FIGS. 7A and 7B are flowcharts illustrating a method for controlling the information processing apparatus according to the first exemplary embodiment of the present invention.

FIG. 9 is a block diagram illustrating an example of a hardware configuration of an information processing apparatus according to a second exemplary embodiment of the present invention.

DESCRIPTION OF THE EMBODIMENTS

Various exemplary embodiments, features, and aspects of the invention will be described in detail below with reference to the drawings.

Figure 1:
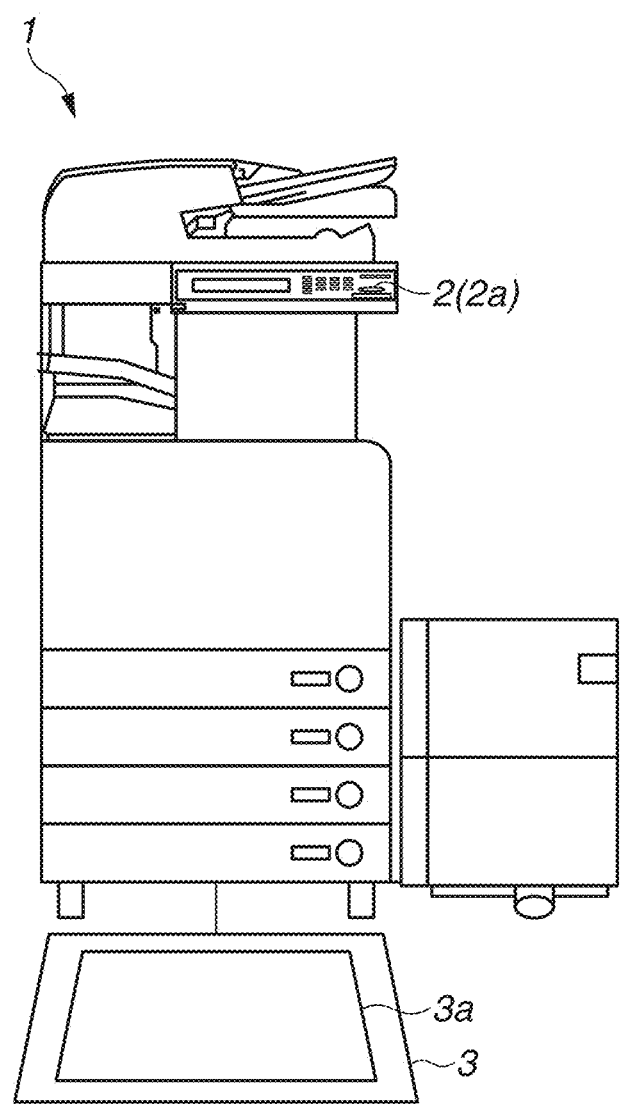
FIG. 1 illustrates an example of an information processing apparatus according to a first exemplary embodiment of the present invention.

FIG. 1 illustrates an example of an information processing apparatus according to a first exemplary embodiment of the present invention.

Examples of the information processing apparatus include an image forming apparatus such as an MFP having various functions including a copy function, a scanner function, a FAX function, and a print function.

In the present exemplary embodiment, the information processing apparatus 1 includes an operation panel 2 and a floor mat 3. The operation panel 2 serves as an operation unit that inputs user's operation instructions. The floor mat 3 is arranged in a predetermined position around the information processing apparatus 1. In the example illustrated in FIG. 1, the floor mat 3 is put in a predetermined position near and in front of the information processing apparatus 1 to correspond to the installed location of the operation panel 2.

In FIG. 1, when the information processing apparatus 1 performs data communication with a mobile terminal 8 (see FIG. 2) held by a user, the information processing apparatus 1 uses a human body communication method for performing data communication through the medium of the user's human body.

The operation panel 2 and the floor mat 3 are configured to function as an interface for, when performing human body communication, connecting the user and the information processing apparatus 1 to be capable of data communication with each other.

The operation panel 2 serving as the operation unit includes a built-in panel communication unit 2a as an interface for performing human body communication via a fingertip of the user who operates the operation panel 2.

The floor mat 3 includes a built-in mat communication unit 3a as an interface for performing human body communication from the feet of the user standing on the floor mat 3. The interface for human body communication of the information processing apparatus 1 may be incorporated in either one or both of the operation panel 2 and the floor mat 3.

The information processing apparatus 1 uses a plurality of methods for human body communication. For example, the information processing apparatus 1 uses an electric field method for performing data communication by using a change in the intensity of an electric field appearing on the surface of a human body.

The electric field method includes transmitting data by changing the intensity of the electric field appearing on the surface of the human body via an electrode in contact with the human body or an electrode adjacent to the human body, and receiving data by detecting a change in the intensity of the electric field appearing on the surface of the human body.

Figure 2:
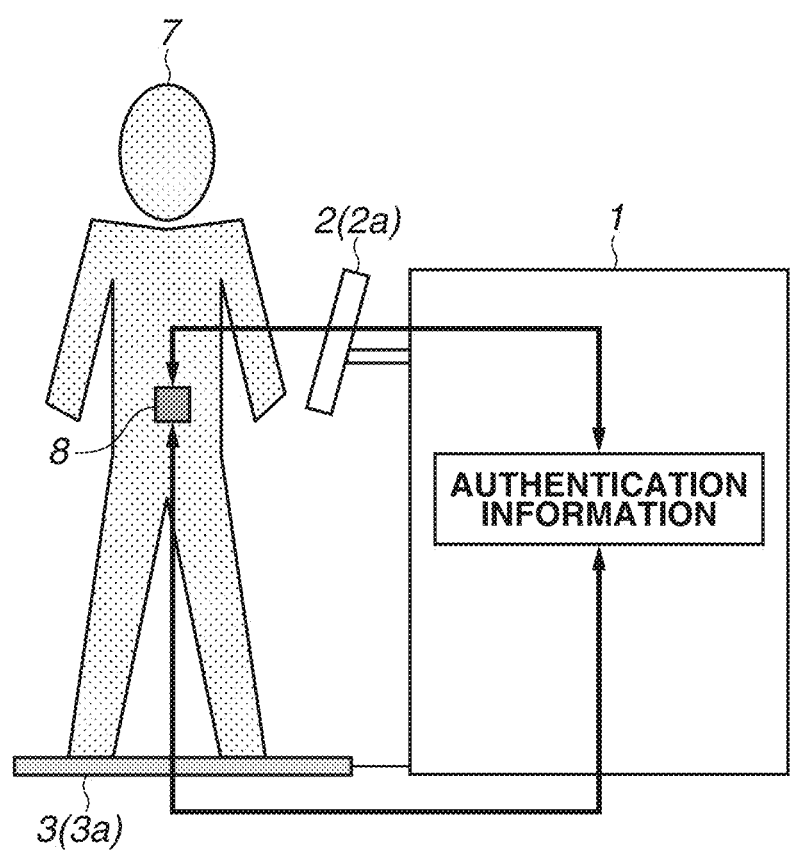
FIG. 2 schematically illustrates human body communication by the information processing apparatus according to the first exemplary embodiment of the present invention.

FIG. 2 schematically illustrates processing for obtaining authentication information by the information processing apparatus 1 illustrated in FIG. 1. In FIG. 2, a plurality of users can log in to the information processing apparatus 1. A user 7 is performing an authentication operation to log in to the information processing apparatus 1. The information processing apparatus 1 starts processing for performing human body communication, for example, when the user 7 touches an electrode for human body communication of the panel communication unit 2a provided in the operation panel 2.

The information processing apparatus 1 transmits a request for authentication information stored in the mobile terminal 8 to the mobile terminal 8 via the operation panel 2 and the human body of the user 7. The information processing apparatus 1 then obtains the authentication information of the user 7 and authenticates the user 7 based on the obtained authentication information.

The information processing apparatus 1 may also be configured to recognize that the user 7 stands on the floor mat 3, via an electrode for human body communication of the mat communication unit 3a provided in the floor mat 3 and then start processing for performing human body communication via the floor mat 3.

If the user authentication succeeds, the information processing apparatus 1 permits the user 7 to log in to a system of the information processing apparatus 1. The information processing apparatus 1 becomes ready to perform various types of processing such as copying and scanning based on an operation instruction.

Figure 3:
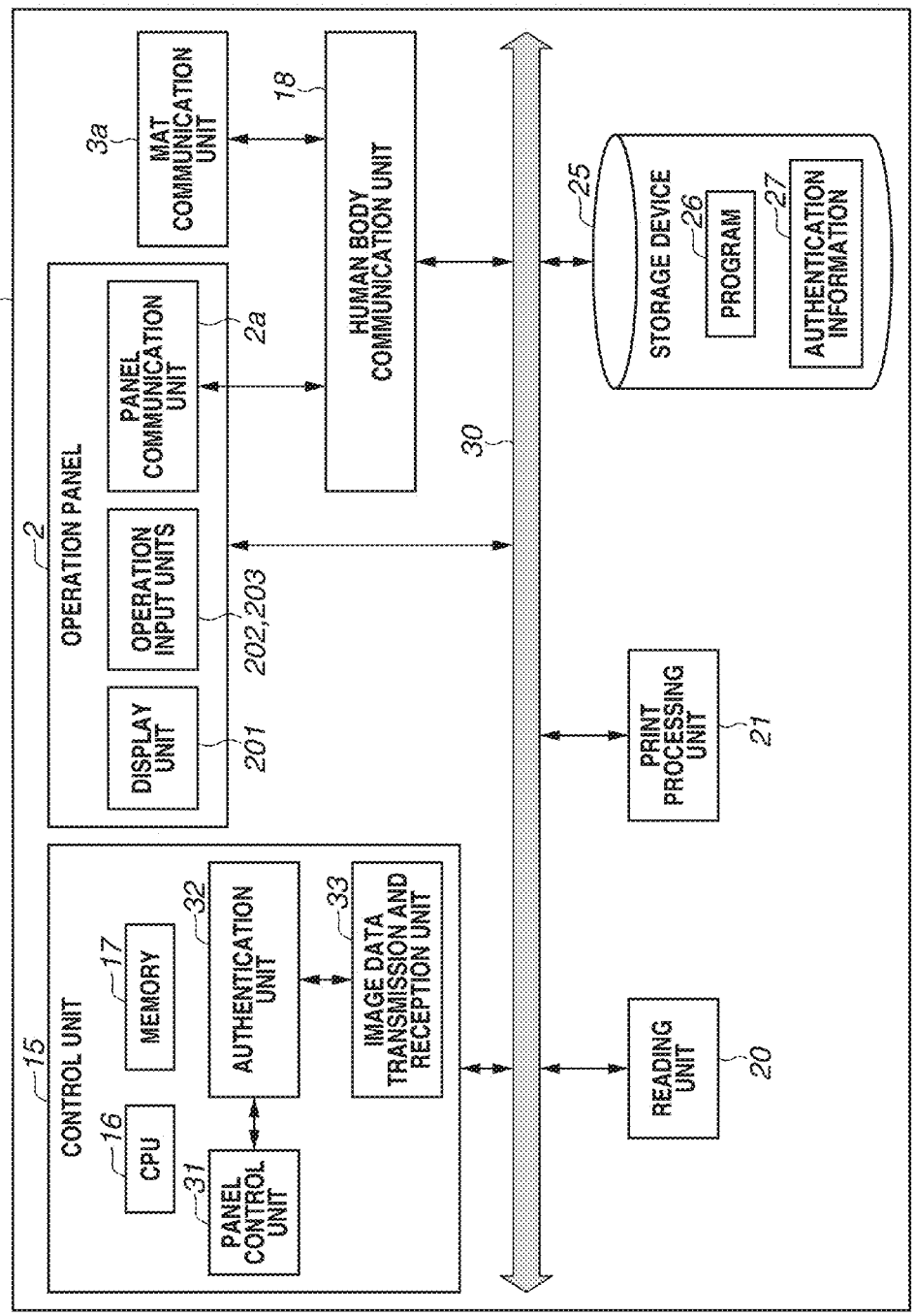
FIG. 3 is a block diagram illustrating an example of a hardware configuration of the information processing apparatus according to the first exemplary embodiment of the present invention.

FIG. 3 is a block diagram illustrating an example of a hardware configuration of the information processing apparatus 1 illustrated in FIG. 1.

In FIG. 3, the information processing apparatus 1 includes a control unit 15 which controls an operation of the information processing apparatus 1, and a storage device 25 which stores various types of information. The information processing apparatus 1 further includes a human body communication unit 18 which performs human body communication, a reading unit 20 which reads a document and outputs image data, a print processing unit 21 which performs print processing based on the image data, and the above-described operation panel 2. Such units are connected via a bus 30 and thereby configured to be able to communicate with each other.

The control unit 15 includes a central processing unit (CPU) 16 and a memory 17, and controls an operation of each unit. The CPU 16 reads and executes a program 26 stored in the storage device 25. The program 26 is a program for causing the control unit 15 to function as various processing units to be described below. The memory 17 temporarily stores data when the CPU 16 executes the program 26.

A display unit 201 of the operation panel 2 includes a configuration for inputting an operation instruction given by the user 7 as described above. The operation panel 2 includes the display unit 201, an operation input unit (touch panel) 202 and an operation input unit (hardware keys) 203, and the panel communication unit 2a. The display unit 201 includes a liquid crystal panel, for example, and displays various types of information. The operation input unit (touch panel) 202 and the operation input unit (hardware keys) 203 detect an operation made on the display unit 201 to input the user's operation instruction. The panel communication unit 2a includes a built-in electrode for use when performing human body communication. As described above, the panel communication unit 2a serves as an interface for performing human body communication via the operation panel 2. The panel communication unit 2a is provided as a first communication unit according to an exemplary embodiment of the present invention. The operation input unit (touch panel) 202 may include a liquid crystal panel allowing a touch input.

Similarly to the panel communication unit 2a described above, the mat communication unit 3a includes an electrode for performing human body communication. The mat communication unit 3a is built in the floor mat 3, which is put in a place corresponding to a position where the user 7 stands to operate the operation panel 2. For example, the floor mat 3 is placed in front of the information processing apparatus 1 where the operation panel 2 is located. Consequently, when operating the operation panel 2 in a usual position, the user 7 naturally stands on the floor mat 3.

The human body communication unit 18 is a communication module that controls human body communication.

The human body communication unit 18 has a function of transmitting a request for authentication data to the mobile terminal 8 via the panel communication unit 2a and/or the mat communication unit 3a, and a function of receiving the authentication data output from the mobile terminal 8 and transferring that information to the control unit 15.

The reading unit 20 is a processing unit that reads a document image and outputs image data. For example, the reading unit 20 includes a document conveyance unit which conveys a plurality of documents placed on a document placing platen one by one from the top, and an image data output unit which converts the read document image into image data and outputs the image data.

The print processing unit 21 is a processing unit that performs print processing based on image data to output a print product. For example, the print processing unit 21 includes an image forming unit, a transfer unit, a fixing unit, and a print product conveyance unit. For each of sheets fed one by one, the image forming unit performs image formation based on image data. The transfer unit transfers a toner image formed by the image forming unit onto the sheet. The fixing unit fixes the transferred toner image to the sheet. The print product conveyance unit discharges a print product.

The storage device 25 stores authentication information 27 aside from the program 26 described above. The authentication information 27 includes ID information of users registered in advance by an administrator, and information of various functions linked with user ID information stored in the mobile terminal 8, such as a job attribute allowing an input operation. Here, specific ID information for authentication/registration may be configured to be obtained from outside via a network communication unit (not illustrated).

Next, a functional configuration related to authentication processing by the control unit 15 in the information processing apparatus 1 will be described in detail with reference to FIG. 3.

When the CPU 16 executes the program 26 in the storage device 25, the control unit 15 functions as each of a panel control unit 31, an authentication unit 32, and an image data transmission and reception unit 33. The authentication unit 32 is a processing unit that performs user authentication by human body communication.

When the user 7 touches the operation panel 2, the panel control unit 31 for controlling an operation of the operation panel 2 detects the contact of the user 7 with the operation panel 2 and determines that the mobile terminal 8 and the information processing apparatus 1 can communicate with each other by human body communication. The panel control unit 31 then instructs the authentication unit 32 to perform authentication processing on the mobile terminal 8 capable of communication via the panel communication unit 2a.

For the floor mat 3, the human body communication unit 18 constantly monitors the presence or absence of the mobile terminal 8 capable of communication via the mat communication unit 3a.

When the user 7 stands on the floor mat 3, the human body communication unit 18 can recognize the mobile terminal 8 capable of communication. The human body communication unit 18 immediately instructs the authentication unit 32 to perform authentication processing on the mobile terminal 8 capable of communication via the mat communication unit 3a.

In response to receiving the authentication instruction, the authentication unit 32 issues a request for authentication information to the mobile terminal 8 via the human body communication unit 18. The human body communication unit 18 transmits the authentication request issued from the authentication unit 32 to the mobile terminal 8 via the panel communication unit 2a or the mat communication unit 3a.

The authentication unit 32 receives the authentication information output as a response from the mobile terminal 8 via the panel communication unit 2a or the mat communication unit 3a and the human body communication unit 18. The authentication unit 32 then searches the storage device 25 to determine whether the same authentication information 27 as the authentication information received from the mobile terminal 8 is stored in the storage device 25.

If the same authentication information 27 as the authentication information received from the mobile terminal 8 is stored in the storage device 25, the authentication unit 32 determines that the user authentication succeeds. As a result, the user 7 can log in to the information processing apparatus 1 and use various functions of the information processing apparatus 1.

On the other hand, if the same authentication information 27 as the authentication information received from the mobile terminal 8 is not stored in the storage device 25, the authentication unit 32 determines that the user authentication fails.

If the user authentication succeeds, the control unit 15, for example, informs the user 7 via the display unit 201 that the login is permitted. The control unit 15 further displays a menu screen as an operation input screen on the display unit 201 of the operation panel 2 so that the user 7 can select processing to perform.

The mobile terminal 8 may be designated as a data transmission and reception destination of the information processing apparatus 1. For example, when the user 7 selects a scan transmission menu, the information processing apparatus 1 provides on the operation panel 2 a display indicating that the mobile terminal 8 can be designated as a transmission destination. On the operation panel 2, the user 7 can designate the mobile terminal 8 as a destination of scan transmission. Then, the information processing apparatus 1 can perform processing for transmitting the image data generated by reading a document image to the mobile terminal 8 via the human body communication unit 18, the panel communication unit 2a or the mat communication unit 3a, and the user's human body.

In another example, when the user 7 selects a print menu on the operation panel 2, the information processing apparatus 1 provides on the operation panel 2 a display indicating that the mobile terminal 8 is a storage source of print data. When the user 7 designates the mobile terminal 8 on the operation panel 2 and selects the print data stored in the mobile terminal 8, the information processing apparatus 1 receives the print data from the mobile terminal 8 via the panel communication unit 2a or the mat communication unit 3a, the user's human body, and the human body communication unit 18. The information processing apparatus 1 then prints the print data by using the print processing unit 21.

Figure 4:
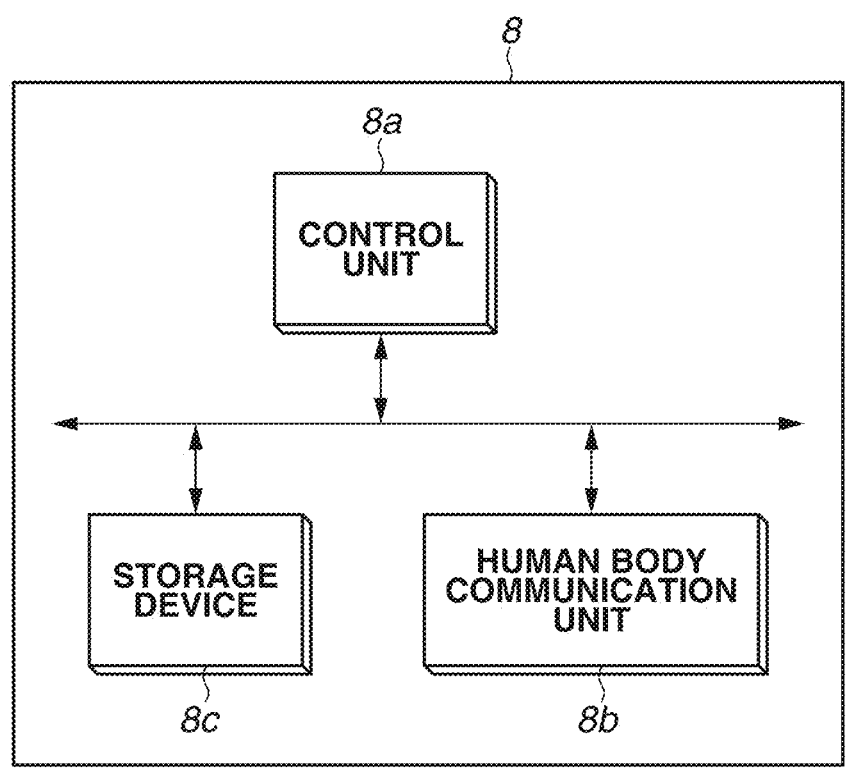
FIG. 4 is a diagram illustrating an example of a hardware configuration of a mobile terminal according to the first exemplary embodiment of the present invention.

FIG. 4 is a diagram illustrating an example of a hardware configuration of the mobile terminal 8 illustrated in FIG. 2.

The mobile terminal 8 includes a control unit 8a which controls an operation of the mobile terminal 8, a human body communication unit 8b for performing human body communication, and a storage device 8c which stores programs and various types of information such as image data. The mobile terminal 8 further includes not-illustrated configurations needed for mobile use, such as a battery and a power supply control unit.

The control unit 8a includes a CPU and a memory. The control unit 8a reads and executes various programs stored in the storage device 8c to perform processing related to human body communication.

The human body communication unit 8b is a communication module that performs human body communication with the information processing apparatus 1. The storage device 8c stores authentication information containing the identification information of the user 7 holding this mobile terminal 8, such as ID. The information processing apparatus 1 can perform user authentication by collating the authentication information 27 stored in the storage device 25 with the authentication information received from the mobile terminal 8.

The mobile terminal 8 having the configuration illustrated in FIG. 4, for example, may be built in a mobile phone or an IC card. If the mobile terminal 8 is built in an IC card, for example, the mobile terminal 8 is configured to, when receiving an authentication request from the information processing apparatus 1 via human body communication, read the authentication information stored in advance in the IC card and send back the read authentication information to the information processing apparatus 1.

The mobile terminal 8 may be implemented in various forms. Possible forms may include a smartphone, a tablet terminal, and a card form such as a radio frequency identifier (RFID).

Figure 5:
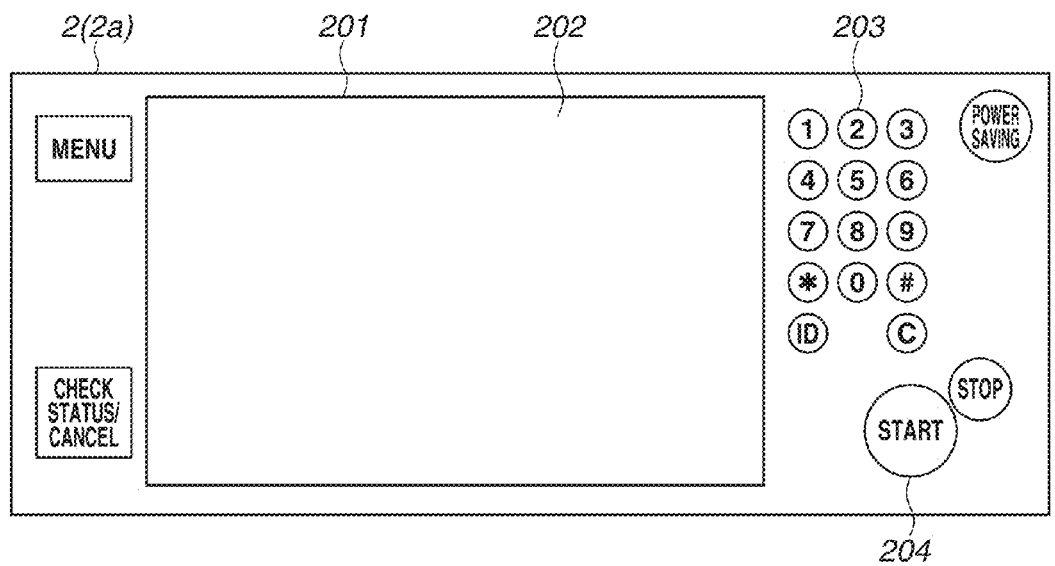
FIG. 5 is a diagram illustrating an overall configuration of an operation panel including a display unit according to the first exemplary embodiment of the present invention.

FIG. 5 illustrates an example of a configuration of the operation panel 2 illustrated in FIG. 3.

The operation panel 2 illustrated in FIG. 5 includes the display unit 201 including a liquid crystal panel, the operation input unit (touch panel) 202, the operation input unit (hardware keys) 203 which includes buttons to be pressed to input numerals, and a start key 204 for executing a set operation.

The operation input unit (hardware keys) 203 and the start key 204 may be configured by displaying desired buttons on the display unit 201 and inputting a touch operation on the operation input unit (touch panel) 202.

Next, an example of the control operation of the information processing apparatus 1 will be described.

FIGS. 6A, 6B, 7A, and 7B are flowcharts illustrating a method for controlling the information processing apparatus 1 according to the present exemplary embodiment. These flowcharts describe a control operation that is performed when various types of operations are performed. The various types of operations include operations for display control such as a screen transition, setting and execution of a job, and preview display of image data. A job refers to work such as printing of a document and printing of image data transmitted to the information processing apparatus 1 via a network.

Figure 6A:
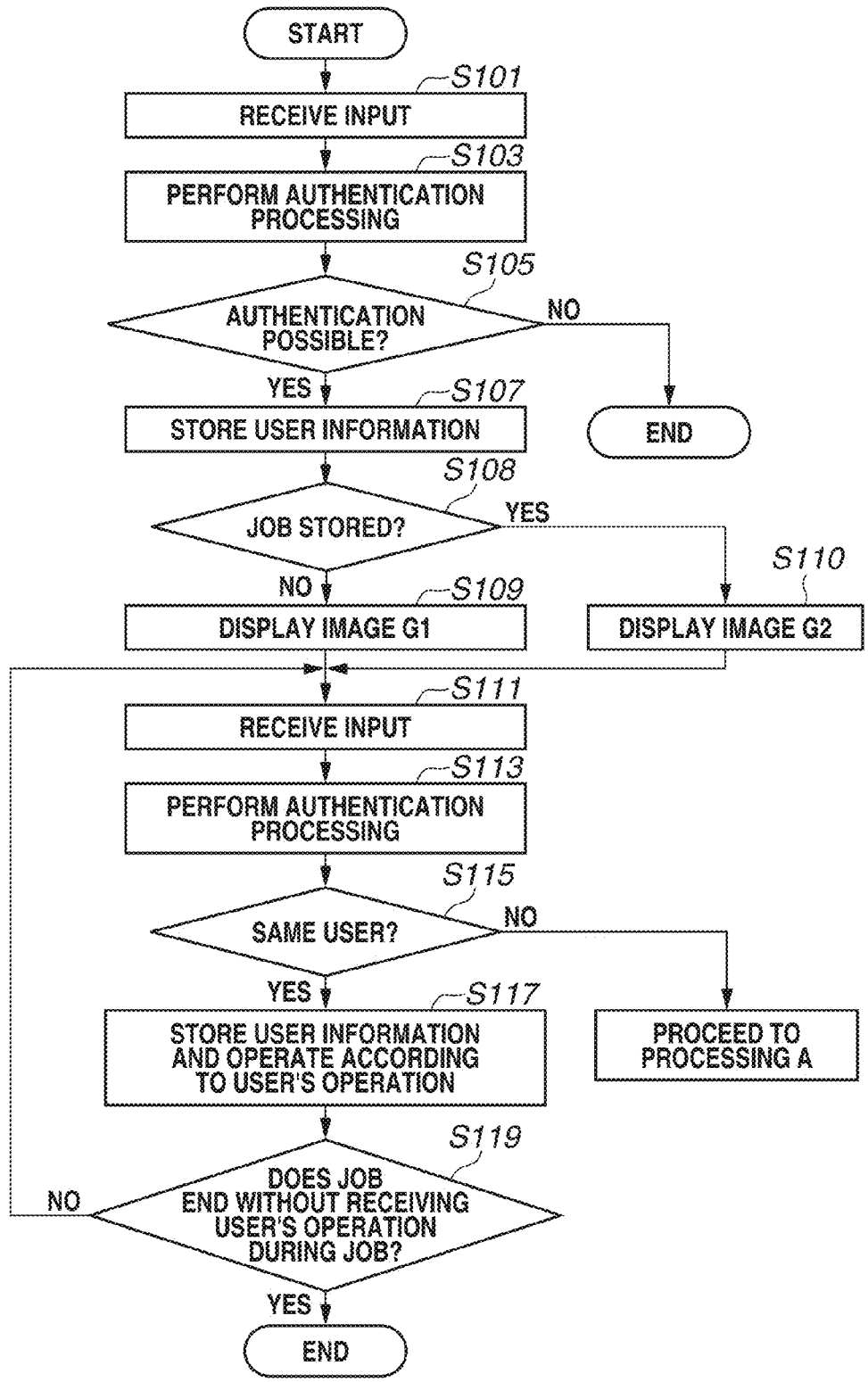
FIGS. 6A and 6B are flowcharts illustrating a method for controlling the information processing apparatus according to the first exemplary embodiment of the present invention.
Figure 6B:
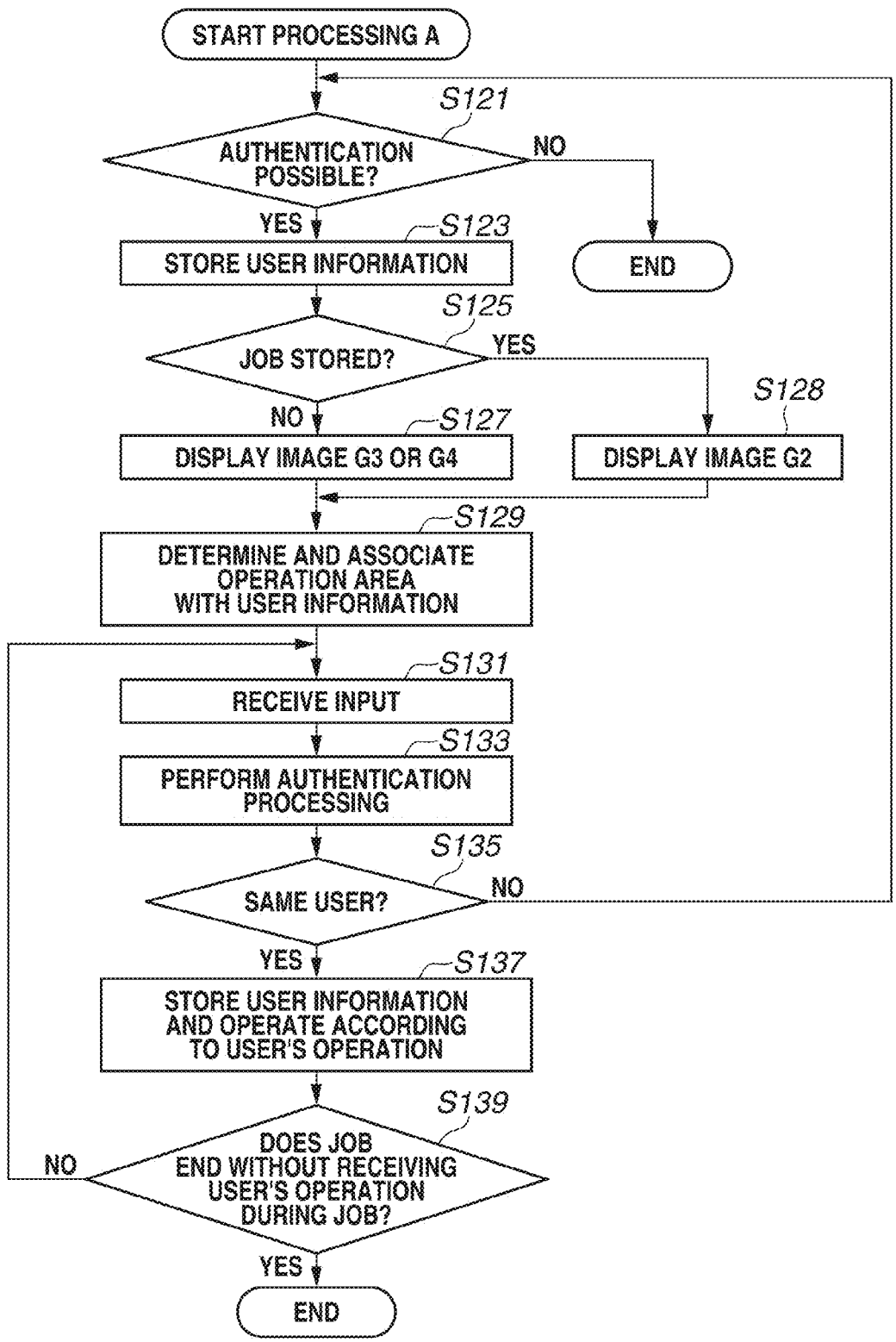
Figure 7B:
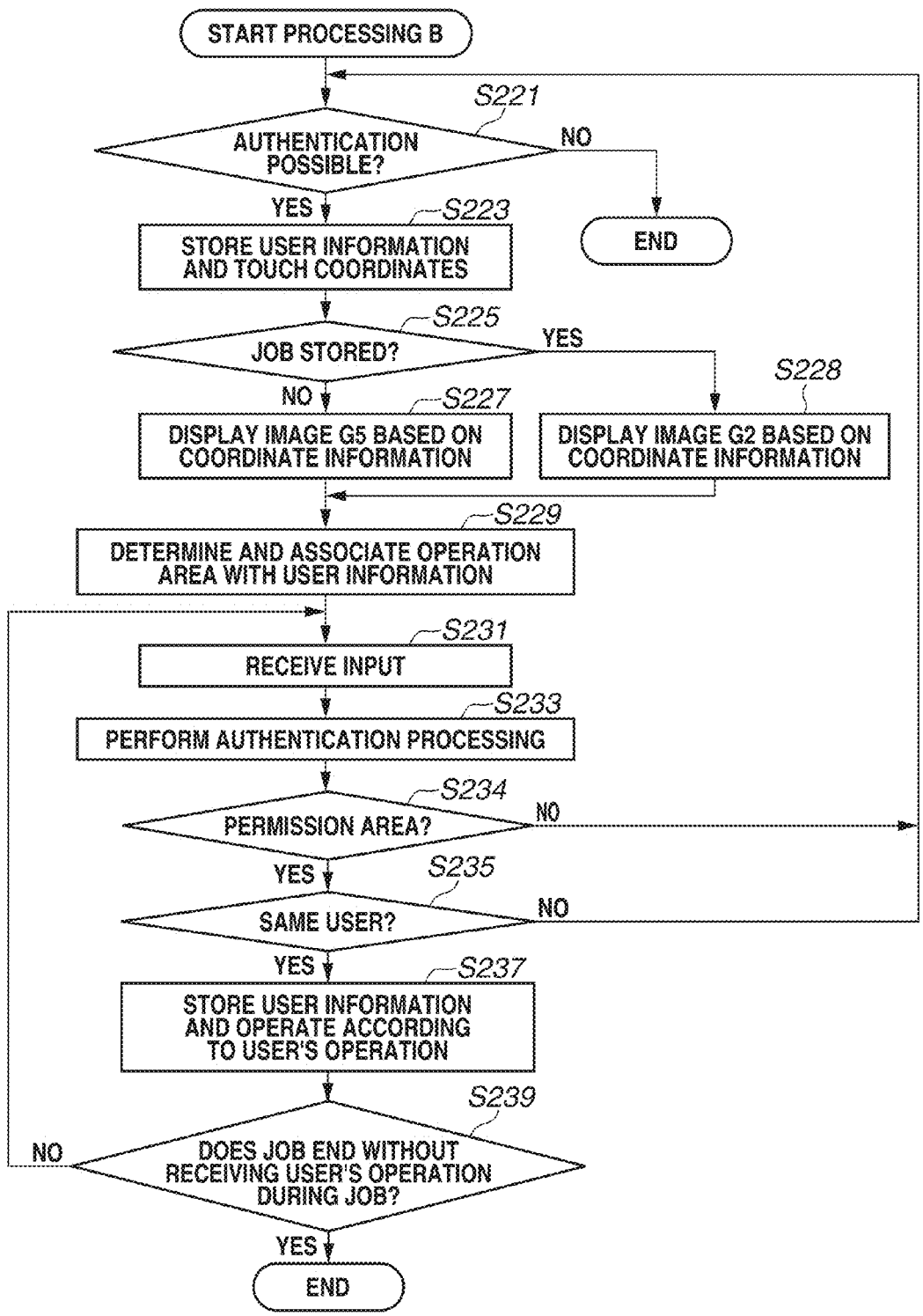

FIGS. 6A and 6B illustrate control which is performed when menus are displayed on the entire part of the display unit 201. FIGS. 7A and 7B illustrate control which is performed when menus are displayed on a part of the display unit 201.

All control determinations related to the flowcharts are performed by the CPU 16 of the information processing apparatus 1. The program 26 of the information processing apparatus 1 is stored in the storage device 25 of the information processing apparatus 1. The program 26 is read into the memory 17 in the control unit 15 and executed by the CPU 16.

When using the information processing apparatus 1, the user holding the mobile terminal 8 operates a desired one of the operation input unit (touch panel) 202 or the operation input unit (hardware keys) 203 of the operation panel 2. For example, the user touches the operation input unit (touch panel) 202 or presses a power saving button provided in the operation input unit (hardware keys) 203 to use a function of the information processing apparatus 1.

First, the control performed when menus are displayed on the entire part of the display unit 201 will be described with reference to FIGS. 6A and 6B.

In step S101, the information processing apparatus 1 receives a touch of a user on the operation input unit (touch panel) 202 of the operation panel 2 as an input. Here, a communication path including the panel communication unit 2a and the user's human body is formed between the mobile terminal 8 held by the user and the human body communication unit 18. Through this communication path, the mobile terminal 8 and the human body communication unit 18 perform data communication with each other.

In step S103, the CPU 16 of the control unit 15 performs authentication processing by collating the user information stored in the storage device 8c of the mobile terminal 8 with the authentication information 27 stored in the storage device 25 to identify the user.

In step S105, the CPU 16 determines whether to authenticate the user. If the CPU 16 determines not to authenticate the user (NO in step S105), the CPU 16 does not permit the user to operate the information processing apparatus 1, and the processing ends.

On the other hand, if, in determining whether to authenticate the user in step S105, the CPU 16 determines to authenticate the user (YES in step S105), the CPU 16 permits the user to operate the information processing apparatus 1. In step S107, the CPU 16 stores the user information into the memory 17.

Here, the user information includes user identification information such as the user's ID, a stored job, and operation contents (screen transition and settings of the job). The user information is stored in the memory 17 until the job is cancelled or the operation is completed according to operation instructions from the user. The user information is automatically deleted from the control unit 15 a predetermined time after the user information becomes not needed.

In step S108, the CPU 16 determines based on the user information whether there is a job of the user.

Figure 8A:
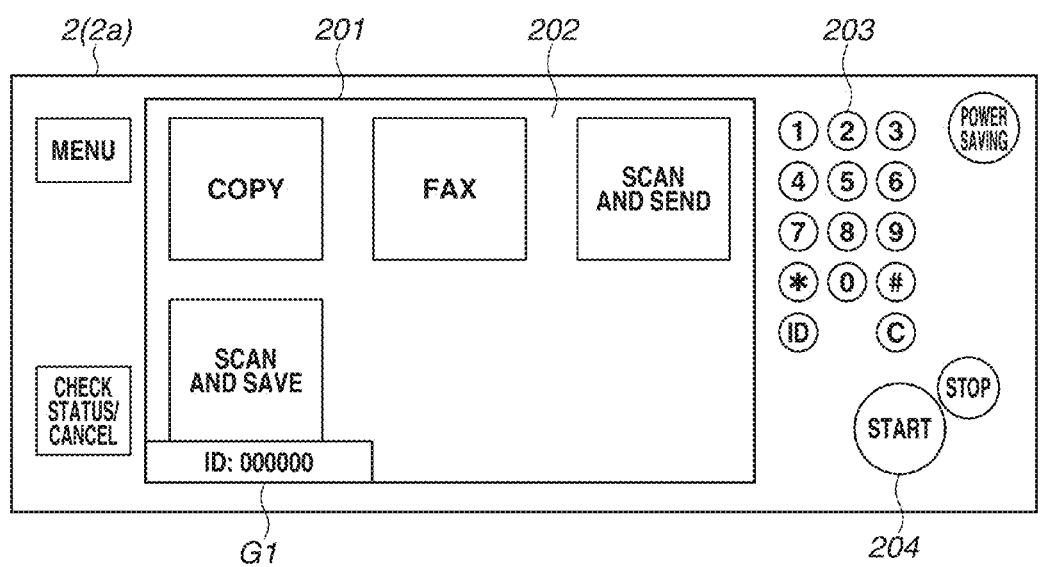
FIGS. 8A, 8B, 8C, 8D, 8E, and 8F each illustrate an example of a screen displayed on the display unit of the operation panel.

If the CPU 16 determines that there is no job of the user (NO in step S108), then in step S109, the CPU 16 displays on the display unit 201 an image G1 corresponding to ID: 000000 as illustrated in FIG. 8A, and waits while prompting the user to input the next operation instruction.

The image G1 displays the ID determined based on the user information, and the processing menus operable by the information processing apparatus 1. Icons corresponding to the respective processing menus are arranged and displayed on the display unit 201. The ID may be displayed in numerals, characters, or a combination of these.

The CPU 16 determines the user's desired operation based on coordinate positions where the icons are displayed and a coordinate position of the operation input unit (touch panel) 202 where the user touches, and receives it as an input of the operation selected by the user.

Figure 8B:
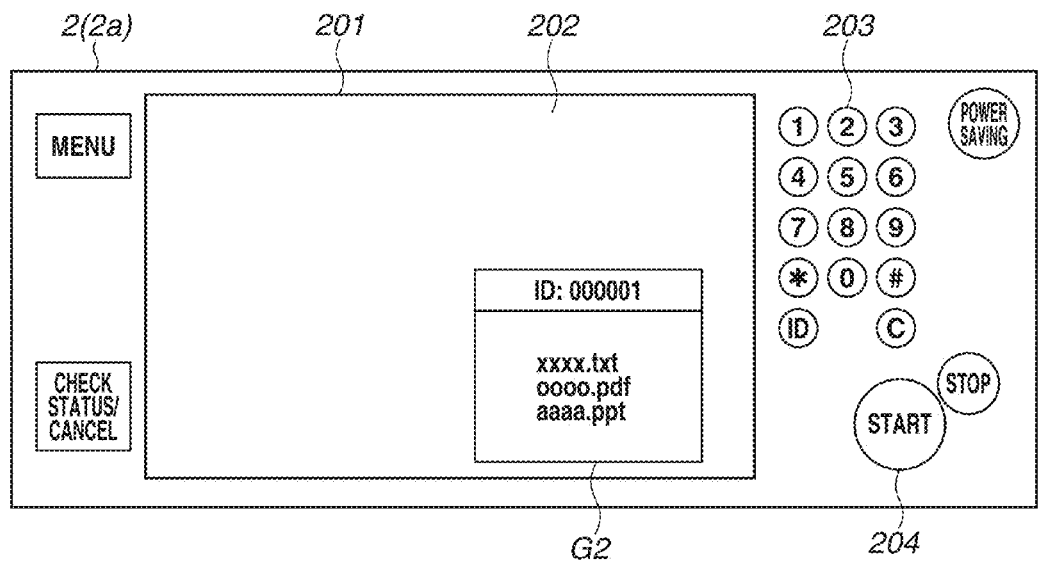

If the CPU 16 determines that there is a job of the user (YES in step S108), then in step S110, the CPU 16 displays an image G2 in an arbitrary position of the display unit 201, as illustrated in FIG. 8B, and waits for the user's next operation. If there is a print job of the user, the image G2 displays both a list of print jobs stored in the storage device 25 and the ID determined based on the user information. When displaying a job, FAX and other data may be displayed if the data is in the user's job.

In any case, if the user's job has a print attribute, the job is the main work of the information processing apparatus 1. It is desirable that the information processing apparatus 1 perform print processing as soon as possible to eliminate needless wait time unless additional detailed instructions need to be input by the user.

In step S111, if the CPU 16 determines that an input to the operation input unit (touch panel) 202 of the operation panel 2 is received from a user, then in step S113, the CPU 16 performs authentication processing similar to that of step S103. In step S115, the CPU 16 collates the user information obtained by the authentication processing with the stored information, and determines whether the operation is made by the same user. If the CPU 16 determines that the operation is made by the same user (YES in step S115), then in step S117, the information processing apparatus 1 executes an operation according to the user's operation.

For example, if the image G1 is displayed and the CPU 16 determines that an operation input is made on the copy icon, the CPU 16 displays a copy setting screen as the execution of the operation.

If the image G2 is displayed and the CPU 16 determines that an operation input is made on any of the items in the list of print jobs, the CPU 16 prints the selected data. The CPU 16 may execute the operation with a press of the start key 204 as a trigger or with an input from the operation input unit (touch panel) 202 as a trigger.

If the CPU 16 of the information processing apparatus 1 determines that the job ends without receiving a user's operation during the execution of the job (YES in step S119), the processing ends. The user information stored in the memory 17 is then discarded.

If the CPU 16 of the information processing apparatus 1 determines that a user's operation is received during the execution of the job (NO in step S119), then in step S113, the CPU 16 performs authentication processing. If the CPU 16 determines that the operation is not made by the same user (NO in step S115), then in step S121, the CPU 16 determines whether to authenticate the user, similarly to step S105. If the CPU 16 determines not to authenticate the user (NO in step S121), the CPU 16 does not permit the user to operate the information processing apparatus 1, and the processing ends.

In step S121, if the CPU 16 determines to authenticate the user (YES in step S121), the CPU 16 permits the user to operate the information processing apparatus 1. In step S123, similarly to step S107, the CPU 16 stores user information of this user into the memory 17.

In step S125, the CPU 16 determines based on the user information whether a job of the user is stored in the storage device 25.

Figure 8C:
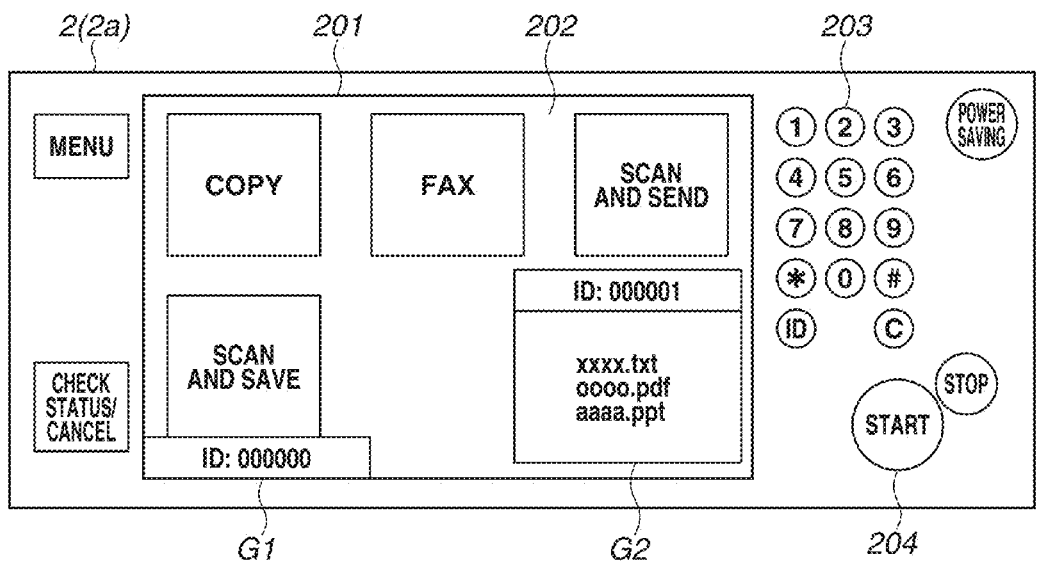
Figure 8D:
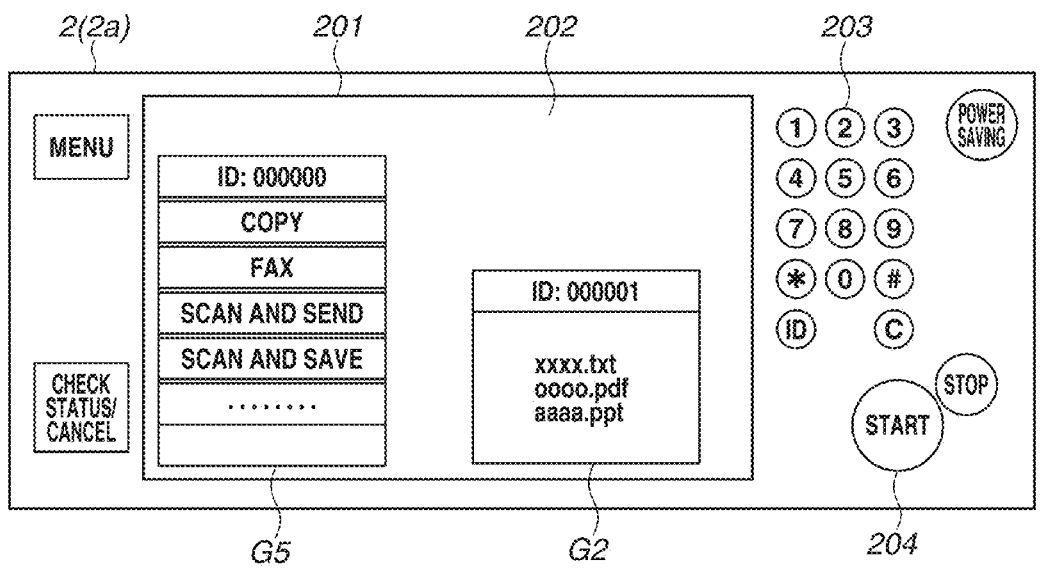
Figure 8E:
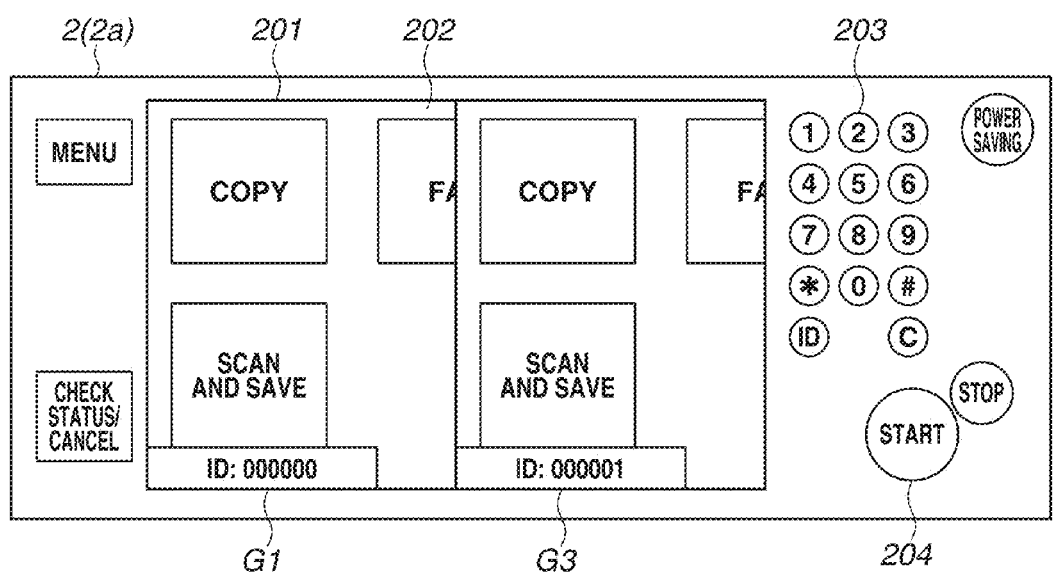
Figure 8F:
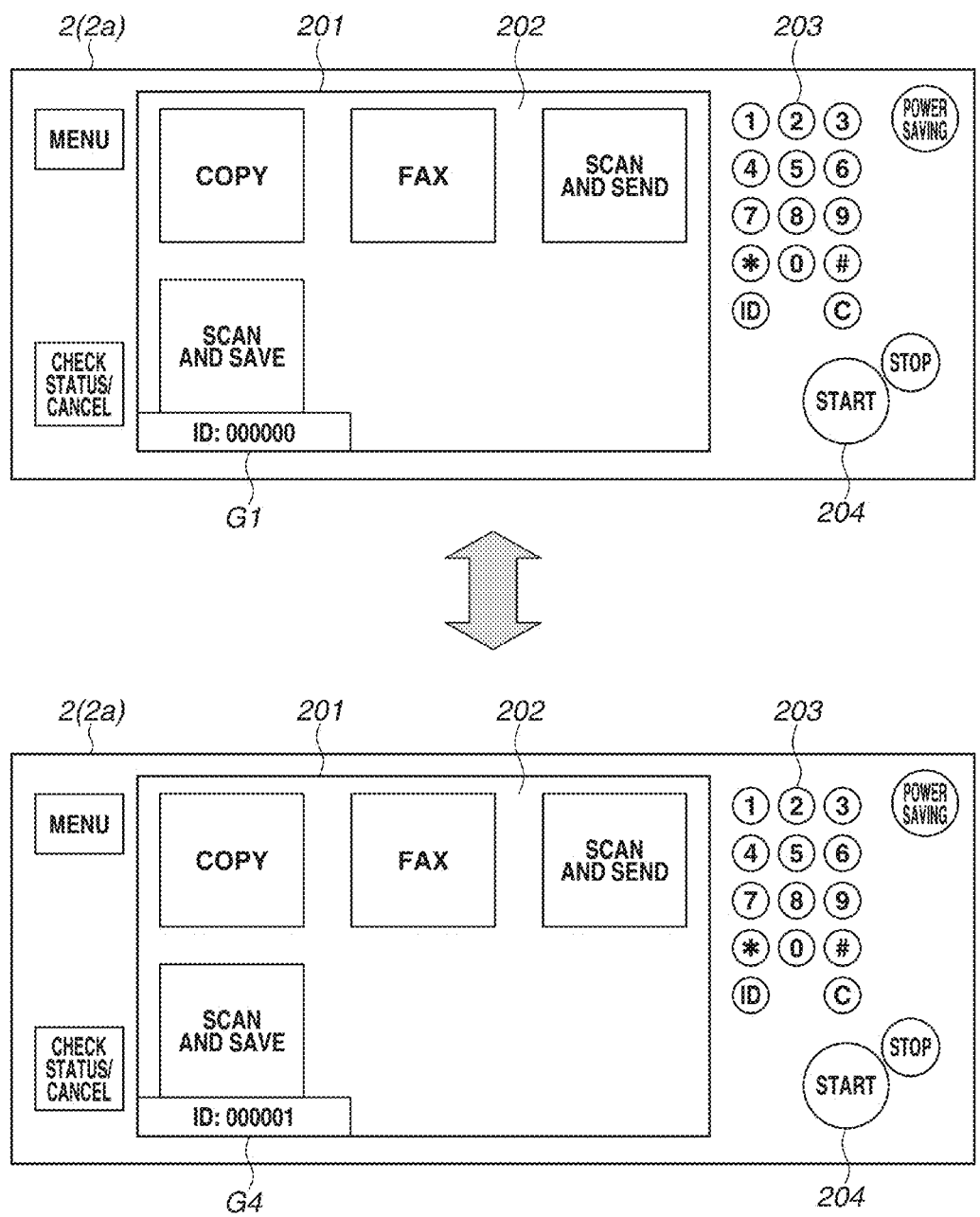

If the CPU 16 determines that no job of the user is stored (NO in step S125), then in step S127, the CPU 16 performs display control to, for example, vertically split an image display area of the display unit 201 into two and display images G1 and G3 of operation selection screens as illustrated in FIG. 8E. Alternatively, as illustrated in FIG. 8F, the CPU 16 may perform display control to alternately display images G1 and G4 of operation selection screens as reception screens corresponding to the respective user IDs. Here, the images G1, G3, and G4 may be used as operation input screens.

Similarly to the image G1, the images G3 and G4 display processing menus accepted and operable by the information processing apparatus 1 based on the ID of the user information. The processing menus are displayed on the display unit 201 as an array of a plurality of icons. Whether to display the image G3 or the image G4 may be selected by the user at the time of operation, or may be determined by the administrator of the information processing apparatus 1 in advance. This setting may be stored in a storage device such as the storage device 25 and set at the time of startup of the information processing apparatus 1.

If the CPU 16 determines that there is a job of the user (YES in step S125), then in step S128, the CPU 16 may display a small window image G2 in an arbitrary position of the display unit 201, as illustrated in FIG. 8C, to indicate that an input of an operation instruction from the user is waited for.

If the user's job has an attribute other than print, the user needs to input several operation instructions after the selection of the job in most cases. In such cases, a relatively larger menu display screen like the images G3 and G4 can be used to prompt the user to input operations. This can reduce the wait time of the information processing apparatus 1 and facilitate simultaneous use of the information processing apparatus 1 by a plurality of users.

In step S129, according to such display areas, the CPU 16 determines an area which permits the user to make an operation as an inputtable area (operation area) associated with the user information and the user. The CPU 16 then waits for the user's next operation. In the case of a split display screen with a plurality of image areas like the images G1 and G3 as illustrated in FIG. 8E, the image area in which the ID corresponding to the user is displayed is the area where an operation is accepted as the operation input screen corresponding to the user.

In the case of a switchable display screen like the images G1 and G4 as illustrated in FIG. 8F, the CPU 16 receives an input only when an operation is made by the corresponding user. If another authenticatable user makes an operation, the CPU 16 dynamically switches the image and the operation area.

In step S131, if the CPU 16 determines that an input to the operation input unit (touch panel) 202 of the operation panel 2 is received from a user, then in step S133, the CPU 16 performs authentication processing. In step S135, the CPU 16 collates the user information obtained by the authentication processing with the stored information, and determines whether the operation is made in an operation permission area by the same user. If the CPU 16 determines that the operation is made by the same user (YES in step S135), then in step S137, the CPU 16 executes the operation of the information processing apparatus 1 according to the user's operation.

If the CPU 16 determines that the job ends without receiving a user's operation during the execution of the job (YES in step S139), the processing ends.

After a predetermined time, the CPU 16 deletes the user information related to the completion of the operation from the memory 17 according to user settings. The time to elapse before the deletion can be set as appropriate.

If the CPU 16 of the information processing apparatus 1 determines that a user's operation is received during the execution of the job (NO in step S139), the processing returns to step S131.

If the CPU 16 determines that the operation is not made by the same user (NO in step S135), the processing returns to step S121. In step S121, the CPU 16 performs new authentication processing, and then performs the subsequent steps. If the CPU 16 determines that the operation is made by the user whose user information is stored in step S107 (YES in step S135), then in step S137, the CPU 16 identifies the input of the operation instruction from the user, based on the user information stored in the memory 17 and the operation input screen of step S129. The CPU 16 then executes an operation based on the instruction.

The above is the control method performed when menus are controlled to be displayed on the entire part of the display unit 201.

If the user's job has a print attribute, the job is the main work of the information processing apparatus 1. It is desirable that the information processing apparatus 1 perform print processing as soon as possible to eliminate needless wait time unless additional detailed instructions need to be input by the user. If the user's job has an attribute other than print, the user needs to input several operation instructions after the selection of the job in most cases. In such cases, using a relatively larger menu display screen to prompt the user to input operations can increase the operation rate of the single information processing apparatus 1, and is effective for a plurality of users to simultaneously use the information processing apparatus 1.

Next, the control performed when menus are displayed in a part of the display unit 201 will be described with reference to the flowcharts illustrated in FIGS. 7A and 7B.

This control is similar to the control illustrated in FIGS. 6A and 6B for displaying menus on the entire part of display unit 201, except for parts related to screen display. The similar parts will thus be described briefly. The parts related to screen display will be described in detail.

In step S201, the CPU 16 of the information processing apparatus 1 receives a touch of a user on the operation input unit (touch panel) 202, which includes a liquid crystal panel allowing a touch input, of the operation panel 2 as an input. The mobile terminal 8 held by the user and the human body communication unit 18 of the information processing apparatus 1 then perform human body communication with each other through a communication path including the panel communication unit 2a and the user's human body, whereby the user information stored in the storage device 8c of the mobile terminal 8 is read and obtained. In step S203, the CPU 16 performs authentication processing by collating the obtained user information with the authentication information 27 stored in the storage device 25 in the main body of the information processing apparatus 1 to indentify the user.

If the CPU 16 determines to authenticate the user (YES in step S205), the CPU 16 permits the user to operate the information processing apparatus 1. In step S207, the CPU 16 stores the user information into the memory 17.

With the touch of the user on the operation panel 2 (in step S201) as a trigger, the CPU 16 starts to receive an input and proceeds with the authentication processing. In step S207, the CPU 16 stores the user information read from the mobile terminal 8 into the memory 17. Here, the CPU 16 also stores touch coordinates detected by the operation input unit (touch panel) 202 of the operation panel 2 into the memory 17.

In step S208, the CPU 16 determines based on the user information whether there is a job of the user. If the CPU 16 determines that there is no job of the user (NO in step S208), then in step S209, the CPU 16 displays an image G5 of a compact processing menu list on the display unit 201 based on the coordinate information stored in the memory 17, as illustrated in FIG. 8D.

If, in step S201, the user touches a left part of the operation panel 2, the image G5 is displayed in a display position in the left part of the display unit 201 of the operation panel 2 based on the detected coordinate information. If the image G5 is displayed in an extreme display position that exceeds the display area of the display unit 201, and fails to be fully displayed, the coordinate information is fine-adjusted so that the image G5 can be fully displayed.

The CPU 16 may identify the coordinate information of the user based on the position of the touch on the operation panel 2 (in step S201) or based on the standing position of the user on the floor mat 3. The CPU 16 may refer to both the pieces of information to accurately identify the coordinate information. The floor mat 3 may include a pressure sensor to detect the standing position of the user.

The image G5 displays the ID of the user and the processing menus usable by the user with the information processing apparatus 1 in a compact list form.

The image G5 of the compact processing menu list (illustrated in FIG. 8D, for example) and the image G1 (illustrated in FIG. 8C, for example) which displays an array of icons corresponding to the respective processing menus on the entire part of the display unit 201 may be dynamically and alternately switched and displayed to prompt the user to input an operation. For a switchable image display, the CPU 16 stores the display contents and the display positions of both the images G1 and G5 in the memory 17 to appropriately identify the instruction content input by the corresponding user.

The panel control unit 31 in the control unit 15 of the information processing apparatus 1 is in charge of the split of the display area, the allocation of the user information and user operation permission areas, the selection of an optimum display image, and a layout adjustment of the entire part of the operation panel 2 for waiting for the user's next operation. Such tasks are substantially performed by the CPU 16.

After the authentication, if the CPU 16 determines that there is a job of the user (YES in step S208), then in step S210, the CPU 16 displays the image G2 of a list of print jobs on the display unit 201, as illustrated in FIG. 8B. In step S210, similarly to step S209, the CPU 16 displays the image G2 on a side closer to the touch position of the user in the display unit 201 based on the coordinate information stored in step S207 to simplify and unify the user interface on the operation panel 2 of the information processing apparatus 1. This enables a plurality of users to naturally operate in their own operation input permission areas without confusion.

In step S212, if the CPU 16 determines that an input to the operation input unit (touch panel) 202 or the operation input unit (hardware keys) 203 of the operation panel 2 is received from a user, then in step S213, the CPU 16 performs authentication processing similar to that of step S203. In step S214, the CPU 16 collates the user information obtained by the authentication processing with the stored information such as the coordinate information to determine whether the input is received in an operation permission area. If the input is received in an area other than an operation permission area (NO in step S214), the processing returns to step S205, i.e., the beginning of authentication processing. The CPU 16 then proceeds with the processing. If the input is received in an operation permission area (YES in step S214), then in step S215, the CPU 16 collates the user information obtained by the authentication processing with the stored information to determine whether the operation is made by the same user. If the CPU 16 determines that the operation is made by the same user (YES in step S215), then in step S217, the information processing apparatus 1 executes an operation according to the user's operation. For example, if the image G5 of a compact processing menu list is displayed and the copy icon is determined to be operated, the execution of the operation includes displaying the copy setting screen. In this case, it is also desirable that the screen be displayed in a display position based on the stored coordinate information.

If the job ends without receiving a user's operation during the execution of the job (YES in step S219), the processing ends. The user information stored in the memory 17 is then discarded.

If the CPU 16 of the information processing apparatus 1 determines that a user's operation is received during the execution of the job (NO in step S219), the processing returns to step S212, i.e., the reception of an input. The CPU 16 then proceeds with the processing.

In step S215, if the CPU 16 determines that the operation is not made by the same user (NO in step S215), then in step S221, the CPU 16 determines whether to authenticate the user. If the CPU 16 determines not to authenticate the user (NO in step S221), the CPU 16 does not permit the user to operate the information processing apparatus 1, and the processing ends.

If the CPU 16 determines to authenticate the user (YES in step S221), the CPU 16 permits the user to operate the information processing apparatus 1. In step S223, the CPU 16 stores the user information into the memory 17. The CPU 16 also stores the touch coordinates detected by the operation input unit (touch panel) 202 into the memory 17.

In step S225, the CPU 16 determines based on the user information whether there is a job of the user. If the CPU 16 determines that there is no job of the user (NO in step S225), then in step S227, the CPU 16 displays the image G5 of a menu list allowing reception processing as an operation selection screen in or near the position of the touch coordinates.

In step S229, according to the display of the image G5 on the operation panel 2, the CPU 16 stores the user information and the display contents and display area of the image G5 of the processing menu list into the memory 17 in association with each other. In other words, the CPU 16 links the user information with the display contents and display area. The CPU 16 then waits for the next operation input.

In step S231, if an input is received, then in step S233, the CPU 16 performs authentication processing. In step S234, the CPU 16 determines whether the detected input coordinates are in a permission area. If the detected input coordinates are not in a permission area (NO in step S234), the processing returns to step S221. The CPU 16 then proceeds with the processing. If the detected input coordinates are in a permission area (YES in step S234), then in step S235, the CPU 16 determines whether the user is the same as the one corresponding to the permission area. If the CPU 16 determines that the user is not the same (NO in step S235), the processing returns to step S221, i.e., the beginning of authentication processing. In step S221, the CPU 16 determines whether to authenticate the user.

If the CPU 16 determines that the user is the same (YES in step S235), then in step S237, the CPU 16 stores the user information and operates according to the input operation. If the job ends without receiving a user's operation during the execution of the job (YES in step S239), the processing ends. The user information related to the completion of the operation is then discarded from the memory 17.

If the CPU 16 of the information processing apparatus 1 receives a user's operation during the execution of the job (NO in step S239), the processing returns to step S231, i.e., the reception of an input. The CPU 16 then proceeds with the processing.

By using the control method described above, the single operation unit can be operated by a plurality of users. The information processing apparatus 1 can be simultaneously used by a plurality of users without providing a plurality of operation units, thereby improving convenience.

In the first exemplary embodiment, the control method has been described for the case where only human body communication is used as an authentication method. However, the authentication method is not limited to human body communication, and a plurality of authentication methods may be used.

FIG. 9 is a block diagram illustrating an example of a hardware configuration of an information processing apparatus according to a second exemplary embodiment.

The present exemplary embodiment is characterized in that a card reader 4 is connected to the bus 30 in addition to the hardware configuration illustrated in FIG. 3. The card reader 4 is a device that can read information allowing identification of an individual, such as an ID, from an IC card in which the information is embedded. The card reader 4 is connected to the control unit 15 via the bus 30.

The card reader 4 includes a control unit 400 and a communication unit 401. The control unit 400 detects a card held over the card reader 4, and controls the communication unit 401. The communication unit 401 reads information from the card held over the card reader 4, and transmits the information to the CPU 16.

Figure 10:
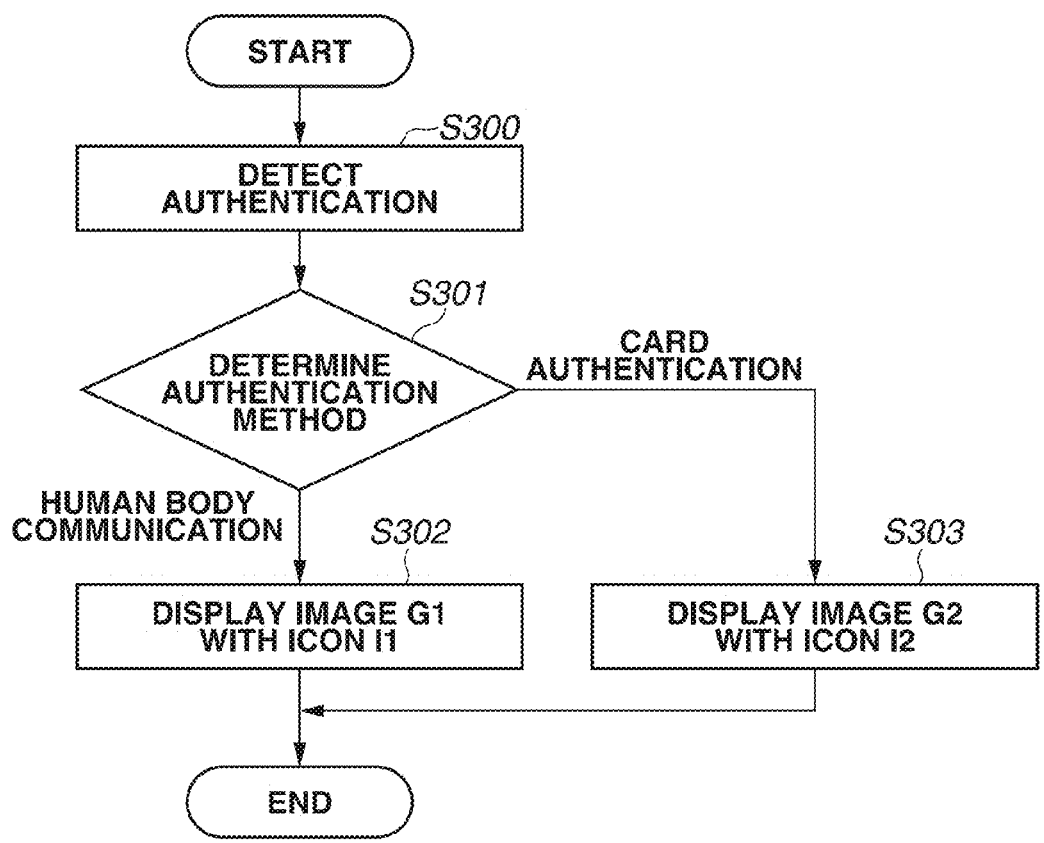
FIG. 10 is flowchart illustrating a method for controlling the information processing apparatus according to the second exemplary embodiment of the present invention.

FIG. 10 is a flowchart illustrating a method for controlling the information processing apparatus 1 that has a plurality of authentication methods.

Control of screen display with the plurality of authentication methods will be described with reference to FIG. 10.

In step S300, the CPU 16 detects authentication attempted by a user. In step S301, the CPU 16 determines the authentication method used for the access via the bus 30.

Figure 11:
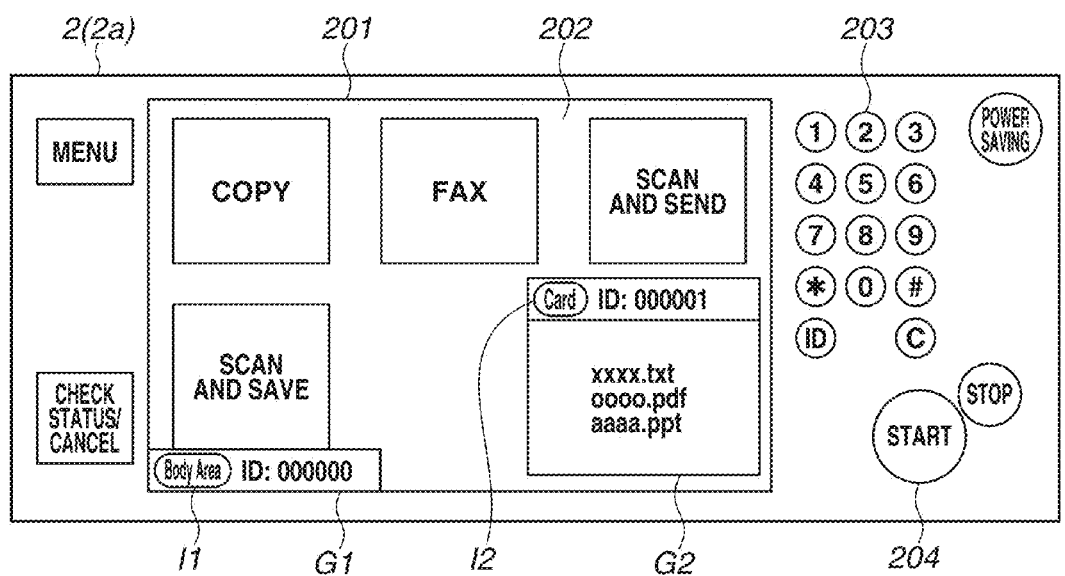
FIG. 11 illustrates an example of screen display with a plurality of authentication methods according to the second exemplary embodiment of the present invention.

If the access is made via the human body communication unit 18, the CPU 16 determines that the authentication is attempted by human body communication (HUMAN BODY COMMUNICATION in step S301). In step S302, the CPU 16 displays an icon I1 suggestive of human body communication and an image G1 which is an operation input screen including an array of operable processing menus, as illustrated in FIG. 11. For example, the icon I1 is an icon with the wording "Body Area" enclosed by an oblong circle. The icon I1 indicates that the authentication is performed by human body communication. The Icon I1 may be displayed next to an ID number. The icon I1 may be displayed in any form as long as it tells the user that the authentication is performed by human body communication.

The determination related to the present flow is made by the CPU 16 of the information processing unit 1. A program of the information processing apparatus 1 is stored in a program area 26 of the storage device 25 of the information processing apparatus 1. The program is read into the memory 17 and executed by the CPU 16.

When the user holding the mobile terminal 8 uses the information processing apparatus 1, the user operates a desired one of the operation input unit (touch panel) 202 or the operation input unit (hardware keys) 203 of the operation panel 2. For example, the user touches the operation input unit (touch panel) 202 or presses a button provided in the operation input unit (hardware keys) 203 to use a function of the information processing apparatus 1.

If the access is made via the communication unit 401 of the card reader 4, the CPU 16 determines that the authentication is performed by using a card (CARD AUTHENTICATION in step S301). In step S303, the CPU 16 displays an image G2 on the display unit 201. As illustrated in FIG. 11, the image G2 includes an icon I2 suggestive of card authentication, the ID number of the user, and a list of print jobs of the user. For example, the icon I2 with the wording "Card" enclosed by an oblong circle indicates that the authentication is performed by using a card. The icon I2 is displayed next to the ID number. The icon I2 may be displayed in any form as long as it tells the user that the authentication is performed by using a card.

An outline of the control related to the human body communication is similar to that of the first exemplary embodiment, and will thus be described briefly. A control method with the authentication method using a card will be described in detail with reference to FIG. 12.

Figure 12:
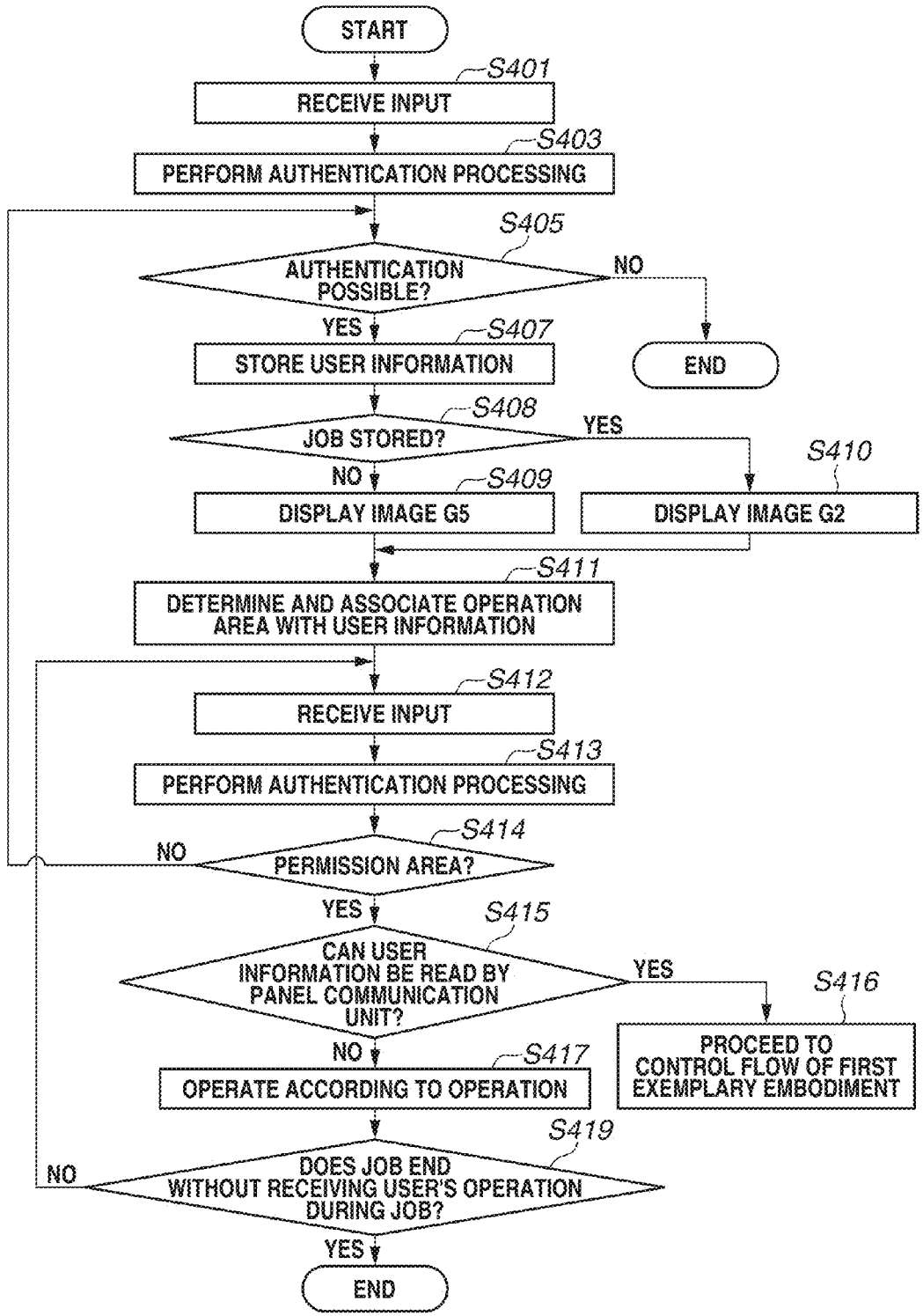
FIG. 12 is another flowchart illustrating a method for controlling the information processing apparatus according to the second exemplary embodiment of the present invention.

FIG. 12 is a flowchart illustrating a method for controlling the information processing apparatus 1 when performing authentication by using a card.

First, in step S401, a user starts the information processing apparatus 1, for example, with a power saving key provided in the operation input unit (hardware keys) 203. The user holds a card over the card reader 4 to activate the communication unit 401 of the card reader 4 and prompt the communication unit 401 to read card information and communicate with the CPU 16. In step S403, the CPU 16 performs authentication by collating the authentication information 27 stored in the storage device 25 with the read card information.

In step S405, the CPU 16 determines whether to authenticate the user. If the CPU 16 determines not to authenticate the user (NO in step S405), the CPU 16 does not permit the user to operate the information processing apparatus 1, and the processing ends.

If the CPU 16 determines to authenticate the user (YES in step S405), the CPU 16 permits the user to operate the information processing apparatus 1.

In step S407, the CPU 16 stores the user information of the user into the memory 17.

In step S408, the CPU 16 determines based on the user information whether there is a job of the user. If the CPU 16 determines that there is no job of the user (NO in step S408), then in step S409, the CPU 16 displays the image G5 of a compact processing menu list on the display unit 201 based on coordinate information stored in the memory 17, as illustrated in FIG. 8D. If the CPU 16 determines that there is a job of the user (YES in step S408), then in step S410, the CPU 16 displays the image G2 of a compact job list on the display unit 201 based on the coordinate information stored in the memory 17, as illustrated in FIGS. 8B, 8C, and 8D.

The image G2 or G5, which is an area operable by the user who is permitted to make an operation by card authentication using the card reader 4, is displayed as follows. For example, if the card reader 4 is physically arranged on the front right end of the information processing apparatus 1, the image G2 or G5 is displayed in a display position closer to the right end of the display unit 201 of the operation panel 2. This gives the user interface a sense of unity, and a plurality of users can naturally find their respective operable areas and smoothly input an operation without confusion.

In step S411, according to the display of the image G5 on the operation panel 2, the CPU 16 stores the user information and the display contents and display area of the image G5 of the processing menu list into the memory 17 in association with each other. In other words, the CPU 16 links the user information with the display contents and display area. The CPU 16 then waits for the next operation input.

In step S412, when the CPU 16 receives an input, then in step S413, the CPU 16 performs authentication processing. In step S414, the CPU 16 determines whether the detected input coordinates are in a permission area. If the detected input coordinates are not in a permission area (NO in step S414), the processing returns to step S405. The CPU 16 then proceeds with the processing. If the detected input coordinates are in a permission area (YES in step S414), then in step S415, the CPU 16 determines whether user information is able to be read by the panel communication unit 2a. If user information is able to be read by the panel communication unit 2a (YES in step S415), human body communication is active. Thus, in step S416, the CPU 16 performs the control flow described in the first exemplary embodiment. If user information is not able to be read by the panel communication unit 2a (NO in step S415), then in step S417, the information processing apparatus 1 operates according to the operation. If the job ends without receiving a user's operation during the execution of the job (YES in step S419), the processing ends. The user information of which the operation is determined to end and which is stored in the memory 17 is discarded here.

The information processing apparatus 1 may be configured to permit card authentication to only one user or to a plurality of users. An authentication method using human body communication and/or an encryption authentication method using an input with a numerical keypad may also be used in combination.

Using the control method described above, the information processing apparatus 1 can permit operations of a plurality of users without providing a plurality of operation units. The authentication method is not limited to the one using human body communication. Even with a plurality of authentication methods, the information processing apparatus 1 can be simultaneously used by a plurality of users, thereby improving convenience.

The first exemplary embodiment has described the case where the authentication of a plurality of users is performed by the authentication method using human body communication. The second exemplary embodiment has described the case where the authentication of a plurality of users is performed by the authentication method using human body communication and the authentication method using the card reader 4.

A third exemplary embodiment will describe a case where the authentication of a plurality of users is performed by a combination of three authentication methods, including an authentication method using input of a personal identification number with a numerical keypad in addition to the authentication method using human body communication and the authentication method using the card reader 4.

Suppose that a user is a middle manager who does not usually give print instructions by himself/herself. Such a user often does not have the mobile terminal 8 or an authentication card. As a practical mode of authentication, a many-digit encryption number may be input for authentication by using a numerical keypad for specifying the number of print sheets as an input unit.

A numerical keypad input unit is usually located on the right side of the display unit 201 of the operation unit such as the operation panel 2, and on the left side of an additional authentication device such as the card reader 4. Suppose that a user is authenticated by the input of a personal identification number with the numerical keypad. In such a case, an operation screen corresponding to the operable area of the user is thus displayed on the right side of an operation screen corresponding to the operable area of a user who is authenticated by human body communication via the display unit 201 of the operation unit. Such an operation screen is also devised to be displayed on the left side of an operation screen corresponding to the operable area of a user who is authenticated by card authentication. This can give the user interface of the display unit 201 of the operation unit a sense of unity, and a plurality of users can naturally find their respective operable areas and smoothly input an operation without confusion.

The authentication method using the input of a personal identification number with the numerical keypad may be put in common use. In such a case, it is desirable to include a liquid crystal display operation panel in the numerical keypad input unit, for example and randomly change the numerical settings behind the keys to ensure security level.

Next, a control operation example of the information processing apparatus 1 according to a fourth exemplary embodiment will be described.

Figure 13:
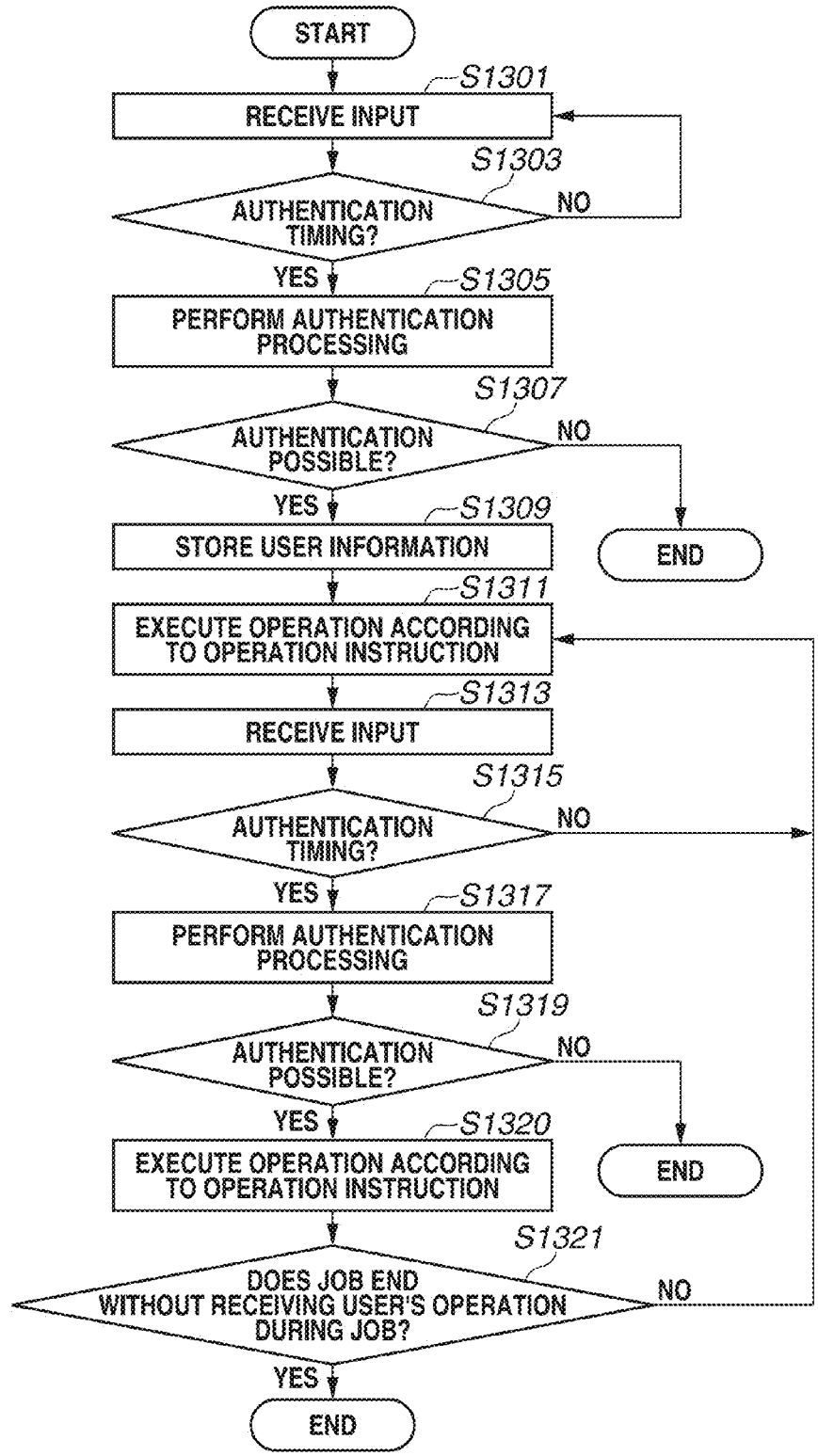
FIG. 13 is a flowchart illustrating a method for controlling an information processing apparatus according to a fourth exemplary embodiment of the present invention.

FIG. 13 is a flowchart illustrating a method for controlling the information processing apparatus 1.

A control operation for performing various types of operations when the authentication of one user is performed by the information processing apparatus 1 will be described with reference to FIG. 13. The various types of operations include ones such as a screen transition, setting and execution of a job, and preview display of image data. A job refers to work such as printing of a document and printing of image data transmitted to the information processing apparatus 1 via a network.

In step S1301, the information processing apparatus 1 receives a touch of a user on the operation input unit (touch panel) 202 of the operation panel 2 as an input.

In step S1303, the information processing apparatus 1 detects and determines the user operation received by the operation panel 2. If the detected operation is a predetermined operation, the information processing apparatus 1 determines that authentication timing has arrived (YES in step S1303) and performs user authentication via human body communication.

Examples of the predetermined operation with which authentication timing is determined to have arrived include an operation for job execution and a request for disclosure of secure information such as a data transmission destination.

Other examples of the predetermined operation include an operation by which the information processing apparatus 1 makes an operation that involves fee charging, and an operation that needs authentication, such as a request for display of a custom menu. If none of such predetermined operations is detected, the information processing apparatus 1 determines that the authenticating timing has not arrived (NO in step S1303). The information processing apparatus 1 performs control and operation according to the position touched by the user, and returns to the reception of an input.

Figure 14A:
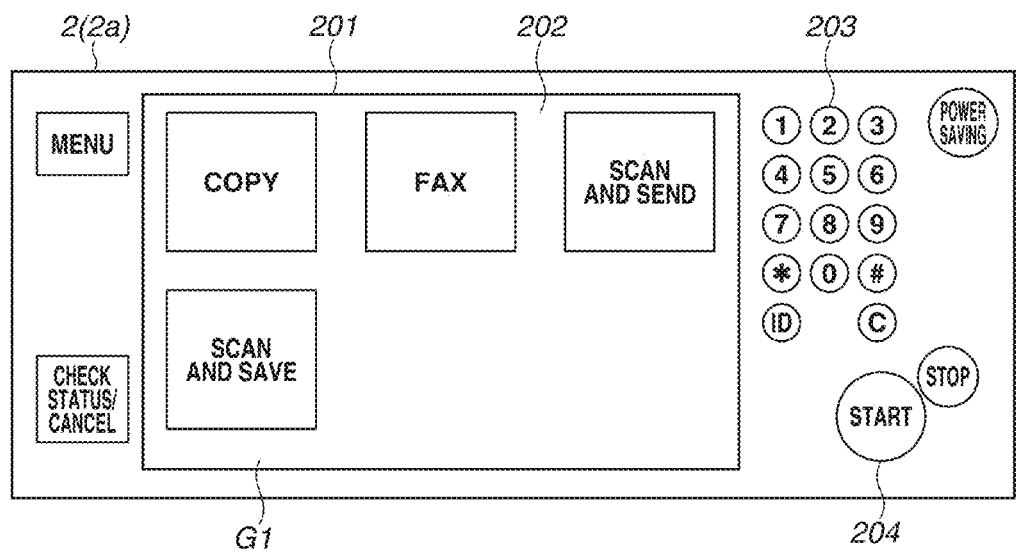
FIGS. 14A and 14B each illustrate an example of a screen displayed on an operation panel according to the fourth exemplary embodiment.

For example, if the input is the first one made by the user, the control and operation refers to displaying an image G1 on the display unit 201, as illustrated in FIG. 14A. The image G1 displays processing menus operable by the information processing apparatus 1 as an array of icons on the display unit 201. The CPU 16 determines the user's desired operation based on the coordinate positions where the icons are displayed and the coordinate position of the operation input unit (touch panel) 202 where the user touches, and receives it as an input of the operation selected by the user.

If predetermined timing for user authentication is determined to have arrived (YES in step S1303), the CPU 16 forms a communication path including the panel communication unit 2a and the user's human body, between the mobile terminal 8 held by the user and the human body communication unit 18. Through this communication path, the mobile terminal 8 and the human body communication unit 18 perform data communication with each other.

In step S1305, the CPU 16 of the control unit 15 performs authentication processing by collating the user information stored in the storage device 8c of the mobile terminal 8 with the authentication information 27 stored in the storage device 25 to identify the user.

In step S1307, the CPU 16 determines whether to authenticate the user. If the CPU 16 determines not to authenticate the user (NO in step S1307), the CPU 16 does not permit the user to the operate the information processing apparatus 1, and the processing ends.

The CPU 16 may perform control to notify the user of the failure of the authentication by displaying the notification on the display unit 201, and prompt the user to make the operation again.

On the other hand, if the CPU 16 determines to authenticate the user (YES in step S1307), the CPU 16 permits the user to operate the information processing apparatus 1. In step S1309, the CPU 16 stores the user information into the memory 17.

The user information includes user identification information such as the user's ID, a stored job, and operation contents (screen transition and settings of the job). The user information is stored in the memory 17 until the job is cancelled or the operation is completed according to operation instructions from the user. The user information is automatically deleted from the control unit 15 a predetermined time after the user information becomes not needed.

Figure 14B:
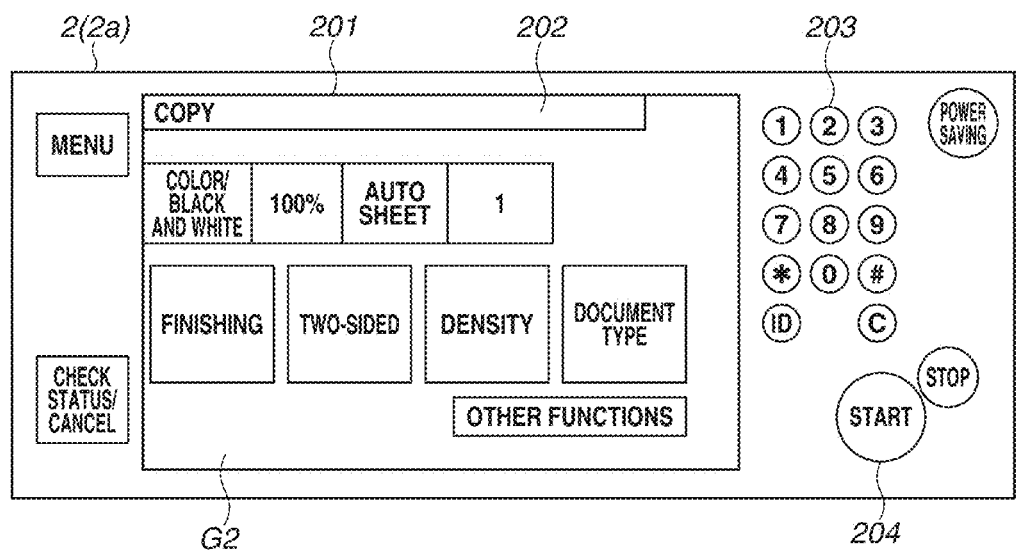

In step S1311, the CPU 16 executes an operation according to the operation instruction. For example, the CPU 16 displays an image G2 on the display unit 201, as illustrated in FIG. 14B, and waits for the user's next operation. The image G2 is an example of a screen displayed on the display unit 201 when the copy icon of the image G1 is touched.

In step S1313, if the CPU 16 determines that an input to the operation input unit (touch panel) 202 or the operation input unit (hardware keys) 203 of the operation panel 2 is received from the user, then in step S1315, the CPU 16 determines whether predetermined timing for user authentication has arrived, similarly to step S1303. If predetermined timing for user authentication is determined to have not arrived (NO in step S1315), then in step S1311, the CPU 16 performs control and operation according to the position touched by the user, and returns to the reception of an input.

If predetermined timing for user authentication is determined to have arrived (YES in step S1315), the CPU 16 forms a communication path including the panel communication unit 2a and the user's human body, between the mobile terminal 8 held by the user and the human body communication unit 18. In step S1317, the control unit 15 performs authentication processing again by collating the user information stored in the storage device 8c of the mobile terminal 8 with the authentication information 27 stored in the storage device 25 to identify the user.

In step S1319, the CPU 16 determines whether to authenticate the user. If the CPU 16 determines not to authenticate the user (NO in step S1319), the CPU 16 does not permit the user to operate the information processing apparatus 1, and the processing ends.

If the CPU 16 determines to authenticate the user (YES in step S1319), the CPU 16 permits the user to operate the information processing apparatus 1.

In step S1320, the information processing apparatus 1 executes an operation according to the user's operation. Suppose, for example, that the image G2 is displayed, copy settings are finished, and then the start key 204 is determined to be pressed. In such a case, the information processing apparatus 1 captures a document placed thereon by using the reading unit 20 and prints the document. Here, the execution of the printing may be triggered by an input from the operation input unit (touch panel) 202.

If the job ends without receiving a user's operation during the execution of the job (YES in step S1321), the processing ends. After a predetermined time, the user information stored in the memory 17 is discarded. If a user's operation is received during the execution of the job (NO in step S1321), the processing returns to step S1311.

The present exemplary embodiment has described that the operation of the information processing apparatus 1 ends if the CPU 16 determines not to authenticate the user. However, the information processing apparatus 1 may be controlled to maintain its state. The information processing apparatus 1 may be configured to notify the user of the failure of the authentication and prompt the user to make the operation again.

The above is the flow of control which is performed with one authentication user of the information processing apparatus 1.

According to this method, the timing of authentication by human body communication is limited to only when a predetermined operation is detected. This can reduce the load of the information processing apparatus 1, decrease the frequency of communications, and provide highly secure user authentication.

The fourth exemplary embodiment has described the method for controlling the information processing apparatus 1 with one authentication user. However, the information processing apparatus 1 can also be controlled even if there are two or more authentication users.

Figure 15A:
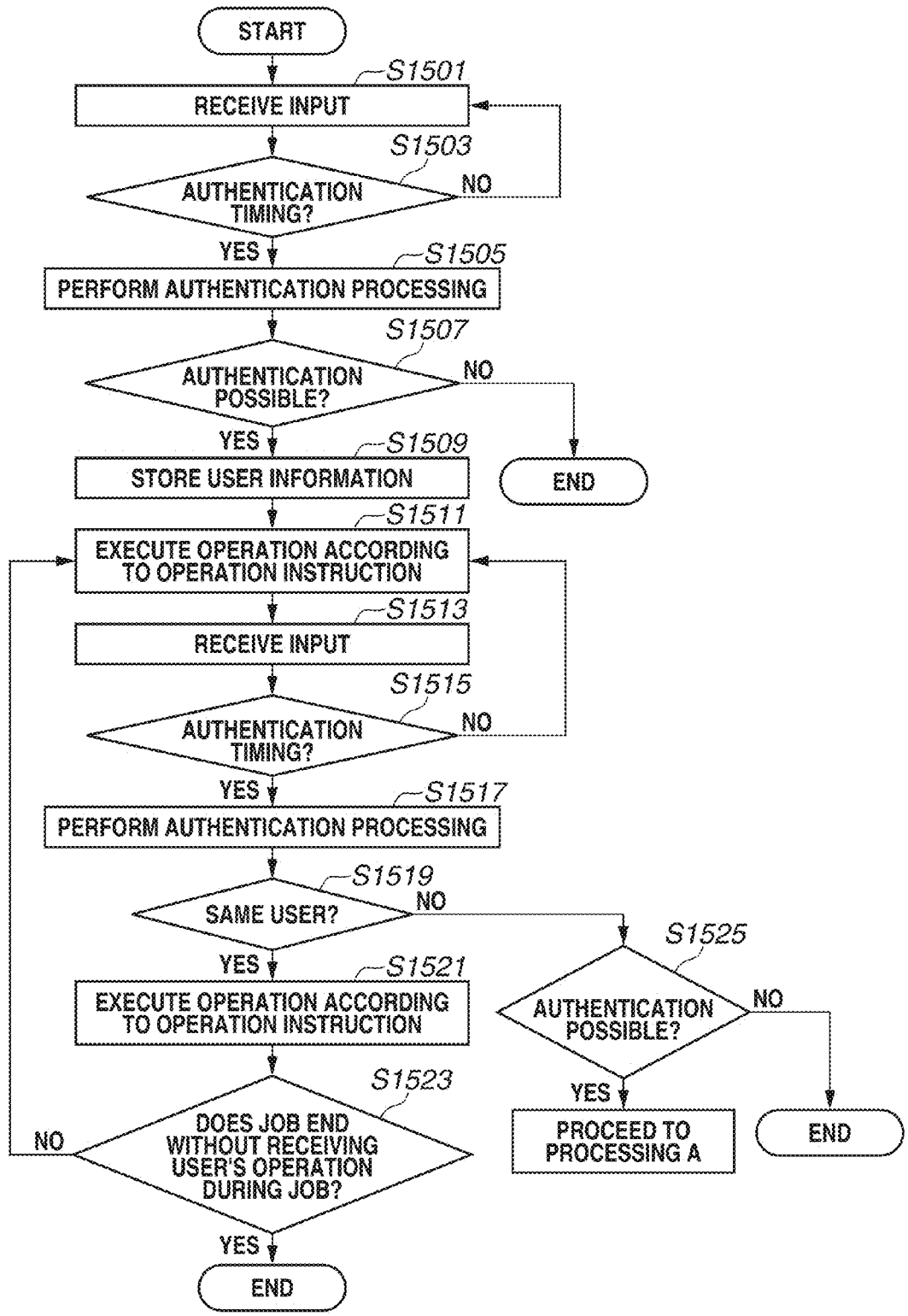
FIGS. 15A and 15B are flowcharts illustrating a method for controlling the information processing apparatus according to a fifth exemplary embodiment of the present invention.
Figure 15B:
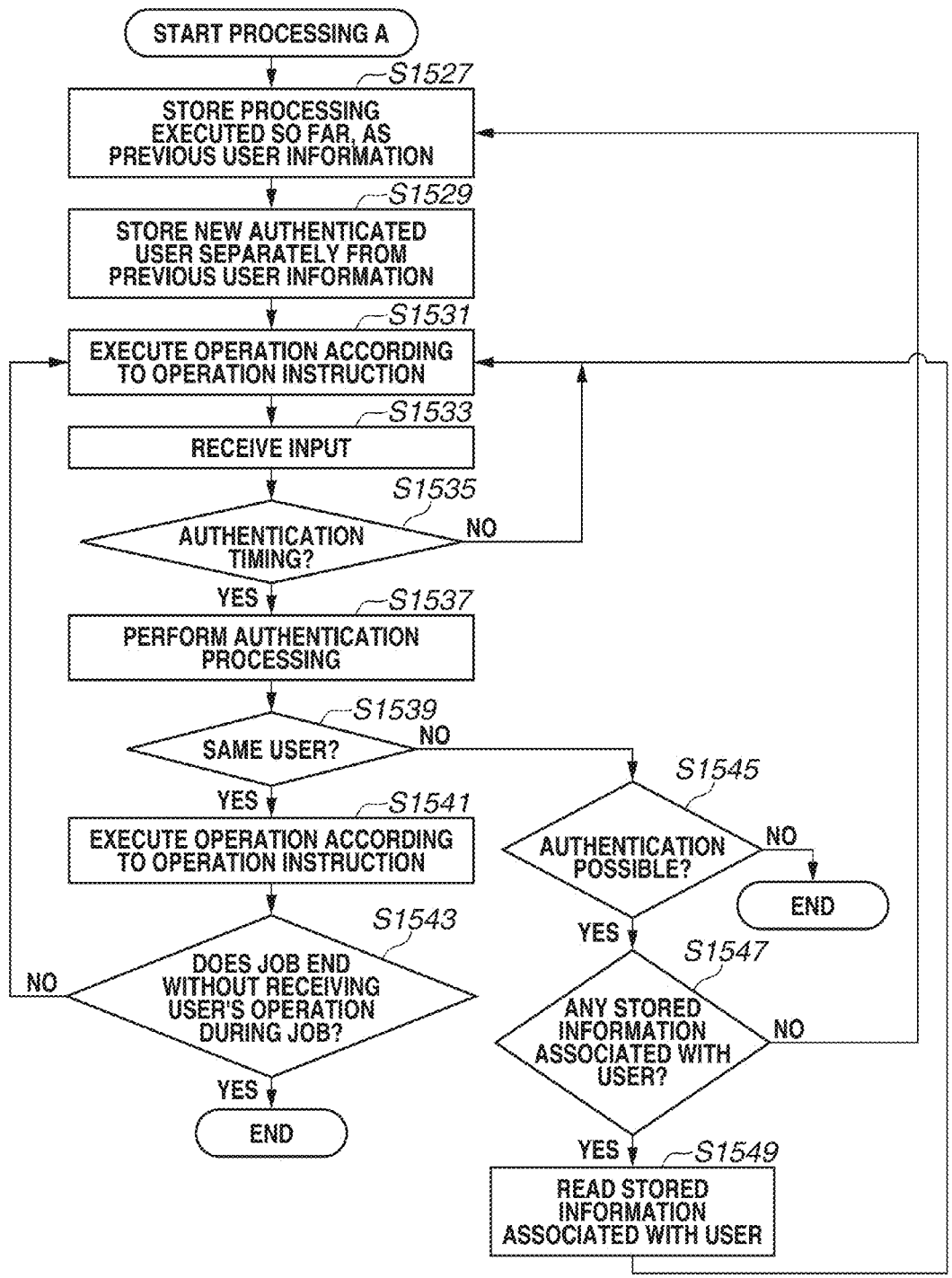

FIGS. 15A and 15B are flowcharts illustrating a method for controlling the information processing apparatus 1.

In a fifth exemplary embodiment, the method for controlling the information processing apparatus 1 with two or more authentication users will be described with reference to FIGS. 15A and 15B. In the following description, control contents redundant with those of the fourth exemplary embodiment will be omitted.

In step S1501, the information processing apparatus 1 receives a touch of a user on the operation input unit (touch panel) 202 or the operation input unit (hardware keys) 203 of the operation panel 2 as an input. In step S1503, the CPU 16 of the information processing apparatus 1 determines whether the timing to perform user authentication via human body communication has arrived. If the timing for user authentication is determined to have not arrived (NO in step S1503), the CPU 16 performs control and operation according to the position touched by the user, and returns to the reception of an input.

More specifically, if the user's operation is detected to be a predetermined operation, the CPU 16 determines that the authentication timing has arrived (YES in step S1503) and the processing proceeds to step S1505. Examples of the predetermined operation include an operation for job execution, a request for discloser of secure information such as a data transmission destination, an operation involving fee charging, and a request for display of a custom menu. In step S1505, the CPU 16 forms a communication path including the panel communication unit 2a and the user's human body, between the mobile terminal 8 held by the user and the human body communication unit 18. The CPU 16 performs data communication to obtain the user information stored in the storage device 8c of the mobile terminal 8. The CPU 16 then performs authentication processing by comparing the obtained user information with the authentication information 27 stored in the storage device 25 to identify the user.

In step S1507, the CPU 16 determines whether to authenticate the user. If the CPU 16 determines not to authenticate the user (NO in step S1507), the CPU 16 does not permit the user to operate the information processing apparatus 1, and the processing ends. On the other hand, if the CPU 16 determines to authenticate the user (YES in step S1507), the CPU 16 permits the user to operate the information processing apparatus 1. In step S1509, the CPU 16 stores the user information of the user into the memory 17.

In step S1511, the information processing apparatus 1 executes an operation according to the operation instruction.

In step S1513, if the CPU 16 determines again that an input to the operation input unit (touch panel) 202 or the operation input unit (hardware keys) 203 of the operation panel 2 is received from a user, then in step S1515, the CPU 16 determines whether predetermined timing for user authentication has arrived, similarly to step S1503.

If predetermined timing for user authentication is determined to have not arrived (NO in step S1515), then in step S1511, the CPU 16 performs control and operation according to the position touched by the user, and returns to the reception of an input. On the other hand, if predetermined timing for user authentication is determined to have arrived (YES in step S1515), the CPU 16 performs human body communication. In step S1517, the control unit 15 performs authentication processing again by collating the user information stored in the storage device 8c of the mobile terminal 8 with the authentication information 27 stored in the storage device 25 to identify the user.

In step S1519, the CPU 16 collates the user information obtained by the authentication processing with stored information to determine whether the operation is made by the same user. If the operation is determined to be made by the same user (YES in step S1519), then in step S1521, the information processing apparatus 1 executes the operation according to the user's operation instruction. If the job ends without receiving a user's operation during the execution of the job (YES in step S1523), the processing ends. The user information stored in the memory 17 is discarded after a predetermined time.

If a user's operation is received during the execution of the job (NO in step S1523), the processing returns to step S1511.

In step S1519, if the CPU 16 determines that the operation is not made by the same user (NO in step S1519), then in step S1525, the CPU 16 determines whether to authenticate the user, similarly to step S1507. If the CPU 16 determines not to authenticate the user (NO in step S1525), the CPU 16 does not permit the user to operate the information processing apparatus 1, and the processing ends.

If the CPU 16 determines to authenticate the user (YES in step S1525), the CPU 16 permits the user to operate the information processing apparatus 1. In step S1527, the CPU 16 stores the processing executed so far into the memory 17 as user information of the previous user (for example, "user A"). In step S1529, the CPU 16 stores the new authenticated user (for example, "user B") into the memory 17 separately from the foregoing user information (user A). In step S1531, the CPU 16 performs control and operation according to the position touched by the user, and returns to the reception of an input. For example, if the user B presses a button for displaying a menu screen, the CPU 16 displays the menu screen. If an operation for displaying contact information is received on a FAX transmission screen, the CPU 16 displays the contact information corresponding to the user B.

In step S1533, if the CPU 16 determines again that an input to the operation input unit (touch panel) 202 or the operation input unit (hardware keys) 203 of the operation panel 2 is received from a user, then in step S1535, the CPU 16 determines whether predetermined timing for user authentication has arrived, similarly to step S1503. If predetermined timing for user authentication is determined to have not arrived (NO in step S1535), then in step S1531, the CPU 16 performs control and operation according to the position touched by the user, and returns to the reception of an input. On the other hand, if predetermined timing for user authentication is determined to have arrived (YES in step S1535), the CPU 16 performs human body communication. In step S1537, the control unit 15 performs authentication processing again by identifying the user based on the user information stored in the storage device 8c of the mobile terminal 8 and the authentication information 27 stored in the storage device 25.

In step S1539, the CPU 16 collates the user information obtained by the authentication processing with the stored information to determine whether the operation is made by the same user (user B). If the operation is determined to be made by the same user (user B) (YES in step S1539), then in step S1541, the information processing apparatus 1 executes the operation according to the user's operation.

If the job ends without receiving a user's operation during the execution of the job (YES in step S1543), the processing ends. The user information (user B) stored in the memory 17 is discarded after a predetermined time.

If a user's operation is received during the execution of the job (NO in step S1543), the processing returns to step S1531.

In step S1539, if the CPU 16 determines that the operation is not made by the same user (user B) (NO in step S1539), then in step S1545, the CPU 16 determines whether to authenticate the user. If the CPU 16 determines not to authenticate the user (NO in step S1545), the CPU 16 does not permit the user to operate the information processing apparatus 1, and the processing ends.

If the CPU 16 determines to authenticate the user (YES in step S1545), the CPU 16 permits the user to operate the information processing apparatus 1. In step S1547, the CPU 16 determines whether information linked with the authenticated user is stored in the memory 17.

If the CPU 16 determines that information linked with the authenticated user is stored (for example, the user information of user A) (YES in step S1547), then in step S1549, the CPU 16 reads the user information of user A and in step S1531, the CPU 16 executes the operation according to the operation instruction.

The CPU 16 subsequently performs similar control until the operation ends (YES in step S1543). If the CPU 16 determines that no information linked with the authenticated user is stored (NO in step S1547), then in step S1527, the CPU 16 stores the processing executed so far into the memory 17 as processing of user B. The CPU 16 subsequently performs similar control until the operation ends (YES in step S1543).

In the present exemplary embodiment, if the CPU 16 determines not to authenticate the user, the operation of the information processing apparatus 1 ends. However, as in the fourth exemplary embodiment, the information processing apparatus 1 may be controlled to maintain its state. The information processing apparatus 1 may be controlled to notify the user of the failure of the authentication and prompt the user to make the operation again.

Various control methods with two or more authentication users have been described above. According to such methods, even if there is a plurality of authentication users, the information processing apparatus 1 can receive operations from the plurality of authentication users, and each of the users can perform communication at a predetermined timing. This can decrease the frequency of communications while ensuring the security of the information processing apparatus 1.

Further, the information processing apparatus 1 starts human body communication and performs authentication according to detection of a predetermined operation from each user and then executes the job. This allows the operation of the information processing apparatus 1 and the switching of the operation according to the users' operation with accuracy. This can also reduce the load of the information processing apparatus 1, decrease the frequency of communications, and enable highly secure user authentication.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2014-112810 filed May 30, 2014, and Japanese Patent Application No. 2014-114671 filed Jun. 3, 2014, which are hereby incorporated by reference herein in its entirety.

What is claimed is:

1. An information processing apparatus which includes a display unit and to which a user can log in, the information processing apparatus comprising:
   a detection unit configured to detect an operation for executing a predetermined job that requires user authentication:
   an authentication unit configured to perform human body communication with a mobile terminal carried by a user who logs in to perform authentication processing on the user who logs in, wherein the user authentication is only performed upon a detection of a pre-designated operation, associated with the predetermined job, detected by the detection unit so as to prevent the user authentication being performed each time an operation of the user is detected; and
   a display control unit configured to display an operation input screen on the display unit, the operation input screen corresponding to a user authenticated by the authentication unit.

2. The information processing apparatus according to claim 1, wherein the display control unit is configured to, if the authenticated user has a job, display a list of jobs of the user on the operation input screen corresponding to the user, and if the authenticated user does not have a job, display an operation selection screen on the operation input screen corresponding to the user.

3. The information processing apparatus according to claim 1, wherein the display control unit is configured to, if a second user logs in when a first user has logged in, split a display area of the display unit and simultaneously display a first operation input screen corresponding to the first user and a second operation input screen corresponding to the second user on the display unit.

4. The information processing apparatus according to claim 1, wherein the display control unit is configured to, if a second user logs in when a first user has logged in, alternately switch and display a first operation input screen corresponding to the first user and a second operation input screen corresponding to the second user on the display unit.

5. The information processing apparatus according to claim 1, wherein communication with the mobile terminal is performed by human body communication via a human body of the user who carries the mobile terminal.

6. The information processing apparatus according to claim 5, wherein an interface for communicating with the mobile terminal by human body communication is built in an operation unit of the information processing apparatus.

7. The information processing apparatus according to claim 5, wherein an interface for communicating with the mobile terminal by human body communication is built in a floor mat arranged around the information processing apparatus.

8. The information processing apparatus according to claim 1, wherein communication with a mobile terminal carried by any one of a plurality of users is performed by using a card reader.

9. The information processing apparatus according to claim 1, wherein the display control unit is configured to also display, on the operation input screen, identification information of the user corresponding to the operation input screen.

10. The information processing apparatus according to claim 1, wherein the display control unit is configured to also display, on the operation input screen, an icon corresponding to a communication method used for the authentication processing on the user corresponding to the operation input screen.

11. The information processing apparatus according to claim 1, wherein the display unit is configured to allow a touch input.

12. The information processing apparatus according to claim 11, wherein the display control unit is configured to control a display position of the operation input screen corresponding to the authenticated user based on a position of the display unit where the user touches.

13. A method for controlling an information processing apparatus which includes a display unit and to which a user can log in, the method comprising:
   detecting an operation for executing a predetermined job that requires user authentication;
   performing human body communication with a mobile terminal carried by a user who logs in to perform authentication processing on the user who logs in, wherein the user authentication is only performed upon a detection of a pre-designated operation associated with the predetermined job so as to prevent the user authentication being performed each time an operation of the user is detected; and
   displaying an operation input screen on the display unit, the operation input screen corresponding to a user authenticated in the authentication processing.

14. A non-transitory computer-readable storage medium storing a program for causing a computer to perform a method, the method comprising:
   detecting an operation for executing a predetermined job that requires user authentication;
   performing human body communication with a mobile terminal carried by a user who logs in to perform authentication processing on the user who logs in, wherein the user authentication is only performed upon a detection of a pre-designated operation associated with the predetermined job so as to prevent the user authentication being performed each time an operation of the user is detected; and
   displaying an operation input screen on a display unit, the operation input screen corresponding to a user authenticated in the authentication processing.

* * * * *